US012738216B2

(12) United States Patent
Wang et al.

(10) Patent No.: US 12,738,216 B2
(45) Date of Patent: Sep. 15, 2026

(54) PIXEL CIRCUIT, DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Xiaoxiao Wang, Beijing (CN); Changlong Yuan, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/874,562

(22) PCT Filed: Nov. 28, 2022

(86) PCT No.: PCT/CN2022/134737

§ 371 (c)(1),
(2) Date: Dec. 12, 2024

(87) PCT Pub. No.: WO2024/113107

PCT Pub. Date: Jun. 6, 2024

(65) Prior Publication Data

US 2025/0378783 A1 Dec. 11, 2025

(51) Int. Cl.
*G09G 3/3233* (2016.01)

(52) U.S. Cl.
CPC ... *G09G 3/3233* (2013.01); *G09G 2300/0408* (2013.01); *G09G 2300/0819* (2013.01);
(Continued)

(58) Field of Classification Search
CPC .. G09G 3/3233; G09G 3/3291; G09G 3/3266; G09G 3/3258; G09G 3/32;
(Continued)

(56) References Cited

U.S. PATENT DOCUMENTS

| | | | |
|---|---|---|---|
| 11,170,719 | B1 | 11/2021 | Lu et al. |
| 2011/0164016 | A1 | 7/2011 | Kang et al. |

(Continued)

FOREIGN PATENT DOCUMENTS

| | | | |
|---|---|---|---|
| CN | 101908316 | A | 12/2010 |
| CN | 102930822 | A | 2/2013 |

(Continued)

OTHER PUBLICATIONS

ISA China National Property Administration, International Search Report and Written Opinion Issued in Application No. PCT/CN2023/110336, Nov. 9, 2023, WIPO, 15 pages. (Submitted with Partial Translation).

(Continued)

*Primary Examiner* — Dong Hui Liang
(74) *Attorney, Agent, or Firm* — WHDA, LLP

(57) ABSTRACT

A pixel circuit, a driving method and a display device are provided. The pixel circuit includes a light emitting element, a driving circuit, a first energy storage circuit, a first control circuit and a data writing-in circuit; the first control circuit is configured to control to connect the first node and the second node under the control of a first light emitting control signal; a first terminal of the first energy storage circuit is electrically connected to the second node, and a second terminal of the first energy storage circuit is electrically connected to the second terminal of the driving circuit; the first energy storage circuit is configured to store electric
(Continued)

energy; the data writing-in circuit is configured to write a data voltage into the second node under the control of a first scanning signal.

18 Claims, 29 Drawing Sheets

(52) U.S. Cl.
CPC ............... *G09G 2300/0852* (2013.01); *G09G 2300/0861* (2013.01); *G09G 2310/08* (2013.01)

(58) Field of Classification Search
CPC .......... G09G 3/3225; G09G 3/20; G09G 3/30; G09G 3/3208; G09G 3/3275; G09G 3/006; G09G 2300/0819; G09G 2300/0842; G09G 2300/0861; G09G 2300/0852; G09G 2300/0426; G09G 2300/0866; G09G 2300/043; G09G 2300/0452; G09G 2300/0809; G09G 2320/0233; G09G 2320/043; G09G 2320/045; G09G 2320/0295; G09G 2320/0285; G09G 2320/029; G09G 2320/0626; G09G 2310/08; G09G 2310/0426; G09G 2310/0251; G09G 2310/0262; G09G 2310/0286; G09G 2310/027; G09G 2310/0297; G09G 2330/021; G09G 2330/028
See application file for complete search history.

(56) References Cited

U.S. PATENT DOCUMENTS

| | | | | |
|---|---|---|---|---|
| 2013/0335399 | A1 | 12/2013 | Tsuge | |
| 2014/0111490 | A1* | 4/2014 | Lee | G11C 19/28 345/204 |
| 2015/0243203 | A1 | 8/2015 | Kim et al. | |
| 2017/0270867 | A1* | 9/2017 | Zhu | G09G 3/3233 |
| 2018/0082652 | A1 | 3/2018 | Lv et al. | |
| 2020/0066212 | A1 | 2/2020 | Kim et al. | |
| 2020/0168156 | A1 | 5/2020 | Yin | |
| 2021/0125547 | A1 | 4/2021 | Lin et al. | |
| 2022/0101777 | A1 | 3/2022 | Kim et al. | |
| 2022/0115485 | A1 | 4/2022 | Yu | |
| 2022/0351671 | A1 | 11/2022 | Xu et al. | |
| 2023/0419896 | A1* | 12/2023 | Zhang | H10K 59/1213 |
| 2024/0119897 | A1 | 4/2024 | Zhang et al. | |

FOREIGN PATENT DOCUMENTS

| | | | |
|---|---|---|---|
| CN | 104599637 | A | 5/2015 |
| CN | 104700778 | A | 6/2015 |
| CN | 106297662 | A | 1/2017 |
| CN | 205984242 | U | 2/2017 |
| CN | 106531074 | A | 3/2017 |
| CN | 107068060 | A | 8/2017 |
| CN | 108520726 | A | 9/2018 |
| CN | 109872692 | A | 6/2019 |
| CN | 110675829 | A | 1/2020 |
| CN | 111179836 | A | 5/2020 |
| CN | 112687189 | A | 4/2021 |
| CN | 112885850 | A | 6/2021 |
| CN | 113506540 | A | 10/2021 |
| CN | 113744683 | A | 12/2021 |
| CN | 113838421 | A | 12/2021 |
| CN | 215265531 | U | 12/2021 |
| CN | 114175257 | A | 3/2022 |
| CN | 114241978 | A | 3/2022 |
| CN | 114255708 | A | 3/2022 |
| CN | 114664253 | A | 6/2022 |
| CN | 114708838 | A | 7/2022 |
| CN | 114783357 | A | 7/2022 |
| JP | 2003114657 | A | 4/2003 |
| JP | 2010197544 | A | 9/2010 |
| JP | 2016027364 | A | 2/2016 |
| KR | 20210131852 | A | 11/2021 |

OTHER PUBLICATIONS

ISA China National Intellectual Property Administration, International Search Report and Written Opinion Issued in Application No. PCT/CN2023/113860, Nov. 10, 2023, WIPO, 20 pages. (Submitted with Partial Translation).
European Patent Office, Extended European Search Report Issued in Application No. 23867136.6, Apr. 16, 2025, Germany, 21 pages.
United States Patent and Trademark Office, Non-Final Office Action Issued in U.S. Appl. No. 18/857,165, Aug. 1, 2025, 31 pages.
United States Patent and Trademark Office, Non-Final Office Action Issued in U.S. Appl. No. 18/695,638, Aug. 19, 2025, 31 pages.
European Patent Office, Extended European Search Report Issued in Application No. 23896249.2, Aug. 20, 2025, Germany, 24 pages.
United States Patent and Trademark Office, Final Office Action Issued in U.S. Appl. No. 18/857,165, Nov. 12, 2025, 27 pages.

* cited by examiner

PIXEL CIRCUIT, DRIVING METHOD AND DISPLAY DEVICE

CROSS-REFERENCE TO RELATED APPLICATION

The present disclosure is the U.S. national phase of PCT Application No. PCT/CN2022/134737 filed on Nov. 28, 2022, which are incorporated herein by reference in their entireties for all purposes.

TECHNICAL FIELD

The present disclosure relates to the field of display technology, in particular to a pixel circuit, a driving method and a display device.

BACKGROUND

In the related art, the pixel circuit capable of internal compensation of the threshold voltage can fully compensate the characteristic deviation of the threshold voltage of the driving transistor, but the number of capacitors is large, which is not conducive to realizing a narrow frame.

SUMMARY

In a first aspect, the present disclosure provides in some embodiments a pixel circuit, including a light emitting element, a driving circuit, a first energy storage circuit, a first control circuit and a data writing-in circuit; wherein a control terminal of the driving circuit is electrically connected to a first node, a first terminal of the driving circuit is electrically connected to a power supply voltage terminal, and a second terminal of the driving circuit is electrically connected to the light emitting element; the driving circuit is configured to drive the light emitting element under the control of a potential of the control terminal of the driving circuit; a control terminal of the first control circuit is electrically connected to a first light emitting control line, a first terminal of the first control circuit is electrically connected to the first node, and a second terminal of the first control circuit is electrically connected to a second node; the first control circuit is configured to control to connect the first node and the second node under the control of a first light emitting control signal provided by the first light emitting control line; a first terminal of the first energy storage circuit is electrically connected to the second node, and a second terminal of the first energy storage circuit is electrically connected to the second terminal of the driving circuit; the first energy storage circuit is configured to store electric energy; the data writing-in circuit is electrically connected to a first scanning terminal, the second node and a data line respectively, and is configured to write a data voltage provided by the data line into the second node under the control of a first scanning signal provided by the first scanning terminal.

Optionally, the pixel circuit further includes a first reference voltage writing-in circuit; wherein the first reference voltage writing-in circuit is electrically connected to a second reset terminal and the first node respectively, and the first reference voltage writing-in circuit is also electrically connected to a reference voltage terminal or the power supply voltage terminal, is configured to write a reference voltage provided by the reference voltage terminal or a power supply voltage provided by the power voltage terminal into the first node under the control of a second reset signal provided by the second reset terminal.

Optionally, the pixel circuit further includes a second reference voltage writing-in circuit; wherein the second reference voltage writing-in circuit is respectively electrically connected to a first reset terminal, the reference voltage terminal and the first node, and is configured to write the reference voltage into the first node under the control of the first reset signal provided by the first reset terminal.

Optionally, the pixel circuit further includes a first light emitting control circuit; wherein the first light emitting control circuit is electrically connected to the second light emitting control line, the power supply voltage terminal and the first terminal of the driving circuit, and is configured to control to connect the power supply voltage terminal and the first terminal of the driving circuit under the control of the second light emitting control signal provided by the second light emitting control line.

Optionally, the pixel circuit further includes a second light emitting control circuit; wherein the second light emitting control circuit is electrically connected to the second light emitting control line, the second terminal of the driving circuit and a first terminal of the light emitting element respectively, is configured to control to connect the second terminal of the driving circuit and the first terminal of the light emitting element under the control of the second light emitting control signal provided by the second light emitting control line.

Optionally, the pixel circuit further includes a first initialization circuit; wherein the first initialization circuit is electrically connected to a first reset terminal, a first reset voltage terminal and the second terminal of the driving circuit, and is configured to write a first reset voltage provided by the first reset voltage terminal into the second terminal of the driving circuit under the control of a first reset signal provided by the first reset terminal; the first reset voltage terminal includes an initial voltage terminal, a first voltage terminal, a reference voltage terminal or the power supply voltage terminal.

Optionally, the driving circuit comprises a driving transistor, the first control circuit comprises a first transistor, and the first energy storage circuit comprises a first capacitor; a gate electrode of the first transistor is electrically connected to the first light emitting control line, a first electrode of the first transistor is electrically connected to the first node, and a second electrode of the first transistor is electrically connected to the second node; a gate electrode of the driving transistor is electrically connected to the first node, a first electrode of the driving transistor is electrically connected to the power supply voltage terminal, and a second electrode of the driving transistor is electrically connected to the light emitting element; a first terminal of the first capacitor is electrically connected to the second node, and a second terminal of the first capacitor is electrically connected to a second electrode of the driving transistor.

Optionally, the first reference voltage writing-in circuit includes a second transistor; a gate electrode of the second transistor is electrically connected to the second reset terminal, a first electrode of the second transistor is electrically connected to the reference voltage terminal, and a second electrode of the second transistor is electrically connected to the first node; or, the gate electrode of the second transistor is electrically connected to the second reset terminal, the first electrode of the second transistor is electrically connected to the power supply voltage terminal, and the second electrode of the second transistor is electrically connected to the first node.

Optionally, the second reference voltage writing-in circuit comprises a third transistor; a gate electrode of the third transistor is electrically connected to the first reset terminal, a first electrode of the third transistor is electrically connected to the reference voltage terminal, and a second electrode of the third transistor is electrically connected to the first node.

Optionally, the first light emitting control circuit comprises a fourth transistor; a gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit; the second light emitting control circuit includes a fifth transistor; a gate electrode of the fifth transistor is electrically connected to the second light emitting control line, a first electrode of the fifth transistor is electrically connected to the second terminal of the driving circuit, a second electrode of the fifth transistor is electrically connected to the first terminal of the light emitting element.

Optionally, the first initialization circuit comprises a sixth transistor; a gate electrode of the sixth transistor is electrically connected to the first reset terminal, a first electrode of the sixth transistor is electrically connected to the initial voltage terminal, the first voltage terminal, the reference voltage terminal or the power supply voltage terminal, and a second electrode of the sixth transistor is electrically connected to the second terminal of the driving circuit.

Optionally, the pixel circuit further includes a second energy storage circuit and a second initialization circuit; wherein a second terminal of the first energy storage circuit is electrically connected to the second terminal of the driving circuit through the second energy storage circuit; a first terminal of the second energy storage circuit is electrically connected to a third node, a second terminal of the second energy storage circuit is electrically connected to the second terminal of the driving circuit, and the second energy storage circuit is configured to store electrical energy; the second initialization circuit is electrically connected to a scanning terminal, the second terminal of the driving circuit, and the second reset voltage terminal, and is configured to control to connect the second terminal of the driving circuit and the second reset voltage terminal under the control of a scanning signal provided by the scanning terminal; the second reset voltage terminal includes an initial voltage terminal, a first voltage terminal or a third node; the scanning terminal includes a first scanning terminal or a second scanning terminal.

Optionally, the pixel circuit further includes a second energy storage circuit, a first reference voltage writing-in circuit, a data writing-in circuit and a first initialization circuit; wherein the second node is electrically connected to the first node through the second energy storage circuit; the first reference voltage writing-in circuit is respectively electrically connected to the reset terminal, the reference voltage terminal and the first node, and is configured to write the reference voltage provided by the reference voltage terminal into the first node under the control of the reset signal provided by the reset terminal; the data writing-in circuit is electrically connected to the first scanning terminal, the second node and the data line respectively, and is configured to write the data voltage provided by the data line into the second node under the control of the first scanning signal provided by the first scanning terminal; the first initialization circuit is electrically connected to the reset terminal, the initial voltage terminal, and the second terminal of the driving circuit, and is configured to write the initial voltage provided by the initial voltage terminal into the second terminal of the driving circuit under the control of the reset signal provided by the reset terminal.

In a second aspect, an embodiment of the present disclosure provides a pixel circuit, comprising a light emitting element, a driving circuit, an energy storage unit, a first control circuit, a data writing-in circuit and a second initialization circuit; wherein a control terminal of the driving circuit is electrically connected to a first node, a first terminal of the driving circuit is electrically connected to a power supply voltage terminal, and a second terminal of the driving circuit is electrically connected to the light emitting element; the driving circuit is configured to drive the light emitting element under the control of a potential of the control terminal of the driving circuit; a control terminal of the first control circuit is electrically connected to a first light emitting control line, a first terminal of the first control circuit is electrically connected to the first node, and a second terminal of the first control circuit is electrically connected to a second node; the first control circuit is configured to control to connect the first node and the second node under the control of a first light emitting control signal provided by the first light emitting control line; the data writing-in circuit is electrically connected to a first scanning terminal, the second node and a data line respectively, and is configured to write a data voltage provided by the data line into the second node under the control of a first scanning signal provided by the first scanning terminal; the second initialization circuit is electrically connected to a scanning terminal, the second terminal of the driving circuit, and a second reset voltage terminal, and is configured to control to connect the second terminal of the driving circuit and the second reset voltage terminal under the control of a scanning signal provided by the scanning terminal; the energy storage unit includes a first energy storage circuit, a second energy storage circuit and a second writing-in circuit; a first terminal of the first energy storage circuit is electrically connected to the second node, a second terminal of the first energy storage circuit is electrically connected to the third node, and the first energy storage circuit is configured to store electric energy; a first terminal of the second energy storage circuit is electrically connected to the third node, a second terminal of the second energy storage circuit is electrically connected to the second terminal of the driving circuit, and the second energy storage circuit is configured to store electrical energy; the second writing-in circuit is electrically connected to a reset terminal and the third node respectively, and is configured to control a potential of the third node under the control of a reset signal provided by the reset terminal.

Optionally, the pixel circuit further includes the second reset voltage terminal comprises an initial voltage terminal, a first voltage terminal or a third node; the scanning terminal includes a first scanning terminal or a second scanning terminal.

Optionally, the pixel circuit further includes a first writing-in circuit; wherein The first writing-in circuit is electrically connected to the reset terminal, a writing-in voltage terminal and a writing-in node respectively, and is configured to write a writing-in voltage provided by the writing-in voltage terminal into the writing-in node under the control of the reset signal provided by the reset terminal; the writing-in node includes the first node or the third node, and the writing-in voltage terminal includes a reference voltage terminal or the power supply voltage terminal.

Optionally, the second writing-in circuit is further electrically connected to a first reset voltage terminal, and is configured to write a first reset voltage provided by the first reset voltage terminal into the third node under the control of the reset signal provided by the reset terminal; the first reset voltage terminal includes the initial voltage terminal, the first voltage terminal, the reference voltage terminal or the power supply voltage terminal.

Optionally, the second writing-in circuit is further electrically connected to the control terminal of the driving circuit, and is configured to control to connect the control terminal of the driving circuit and the third node under the control of the reset signal.

Optionally, the pixel circuit further includes a first light emitting control circuit; wherein the first light emitting control circuit is electrically connected to a second light emitting control line, the power supply voltage terminal and the first terminal of the driving circuit respectively, is configured to control to connect the power supply voltage terminal and the first terminal of the driving circuit under the control of a second light emitting control signal provided by the second light emitting control line.

Optionally, the first energy storage circuit comprises a first capacitor; the second energy storage circuit comprises a second capacitor, and the second initialization circuit comprises a seventh transistor; a gate electrode of the seventh transistor is electrically connected to a first scanning terminal or a second scanning terminal, a first electrode of the seventh transistor is electrically connected to a second reset voltage terminal, and a second electrode of the seventh transistor electrically connected to the second terminal of the driving circuit; a first terminal of the first capacitor is electrically connected to the second node, and a second terminal of the first capacitor is electrically connected to the third node; a first terminal of the second capacitor is electrically connected to the third node, and a second terminal of the second capacitor is electrically connected to the second terminal of the driving circuit.

Optionally, the first writing-in circuit comprises an eighth transistor; a gate electrode of the eighth transistor is electrically connected to the reset terminal, a first electrode of the eighth transistor is electrically connected to the reference voltage terminal, and a second electrode of the eighth transistor is electrically connected to the control terminal of the driving circuit.

Optionally, the second writing-in circuit comprises a ninth transistor; a gate electrode of the ninth transistor is electrically connected to the reset terminal, a first electrode of the ninth transistor is electrically connected to the first reset voltage terminal, and a second electrode of the ninth transistor is electrically connected to the third node.

Optionally, the second writing-in circuit comprises a ninth transistor; a gate electrode of the ninth transistor is electrically connected to the reset terminal, a first electrode of the ninth transistor is electrically connected to the third node, and a second electrode of the ninth transistor is connected to the control circuit of the driving circuit.

Optionally, the first light emitting control circuit comprises a fourth transistor; a gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit.

Optionally, the data writing-in circuit comprises a tenth transistor; a gate electrode of the tenth transistor is electrically connected to the first scanning terminal, a first electrode of the tenth transistor is electrically connected to the second node, and a second electrode of the tenth transistor is electrically connected to the data line; the first control circuit includes a first transistor; a gate electrode of the first transistor is electrically connected to the first light emitting control line, a first electrode of the first transistor is electrically connected to the first node, and a second electrode of the first transistor is electrically connected to the second node.

In a third aspect, an embodiment of the present disclosure provides a driving method applied to the pixel circuit, wherein the driving method includes: driving, by the driving circuit, the light emitting element under the control of the potential of the control terminal of the driving circuit; controlling, by the first control circuit, to connect the first node and the second node under the control of the first light emitting control signal provided by the first light emitting control line; storing, by the first energy storage circuit, electric energy; writing, by the data writing-in circuit, the data voltage provided by the data line into the second node under the control of the first scanning signal provided by the first scanning terminal.

Optionally, the pixel circuit further includes a first initialization circuit; the display period includes a first phase and a second phase set successively, and the driving method further includes: in the first phase, the first initialization circuit writing the first reset voltage into the second terminal of the driving circuit; in the second phase, the first initialization circuit writing the first reset voltage into the second terminal of the driving circuit; the data writing-in circuit writing the data voltage provided by the data line into the second node under the control of the first scanning signal.

In a fourth aspect, an embodiment of the present disclosure provides a driving method applied to the pixel circuit, wherein the driving method includes: driving, by the driving circuit, the light emitting element under the control of the potential of the control terminal of the driving circuit; controlling, by the first control circuit, to connect the first node and the second node under the control of the first light emitting control signal provided by the first light emitting control line; storing, by the first energy storage circuit, electric energy; storing, by the second energy storage circuit, electric energy; writing, by the data writing-in circuit, the data voltage provided by the data line into the second node under the control of the first scanning signal provided by the first scanning terminal; controlling, by the second initialization circuit, to connect the second terminal of the driving circuit and the second reset voltage terminal under the control of the scanning signal provided by the scanning terminal; controlling, by the second writing-in circuit, the potential of the third node under the control of the reset signal provided by the reset terminal.

Optionally, the pixel circuit further includes a first writing-in circuit; the display period includes a first phase and a second phase set successively; the driving method includes: in the first phase, the first writing-in circuit writing the writing-in voltage into the control terminal of the driving circuit, the second initialization circuit controlling to connect the second terminal of the driving circuit and the second reset voltage terminal, and the second writing-in circuit writing the first reset voltage into the third node, and the data writing-in circuit writing the data voltage provided by the data line into the second node; in the second phase, the first writing-in circuit writing the writing-in voltage into the control terminal of the driving circuit, and the second writing-in circuit writing the first reset voltage into the third node.

Optionally, the pixel circuit further includes a first writing-in circuit; the display period includes a first phase and a second phase set successively; the driving method includes: in the first phase, the first writing-in circuit writing the writing-in voltage into the control terminal of the driving circuit or the third node, and the second initialization circuit controlling to connect the second terminal of the driving circuit and the second reset voltage terminal, the second writing-in circuit controlling to connect the control terminal of the driving circuit and the third node, and the data writing-in circuit writing the data voltage provided by the data line into the second node; in the second phase, the first writing-in circuit writing the writing-in voltage into the control terminal of the driving circuit or the third node, and the second writing-in circuit controlling to connect the control terminal of the driving circuit and the third node.

In a fifth aspect, an embodiment of the present disclosure provides a display device including the pixel circuit.

DETAILED DESCRIPTION

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
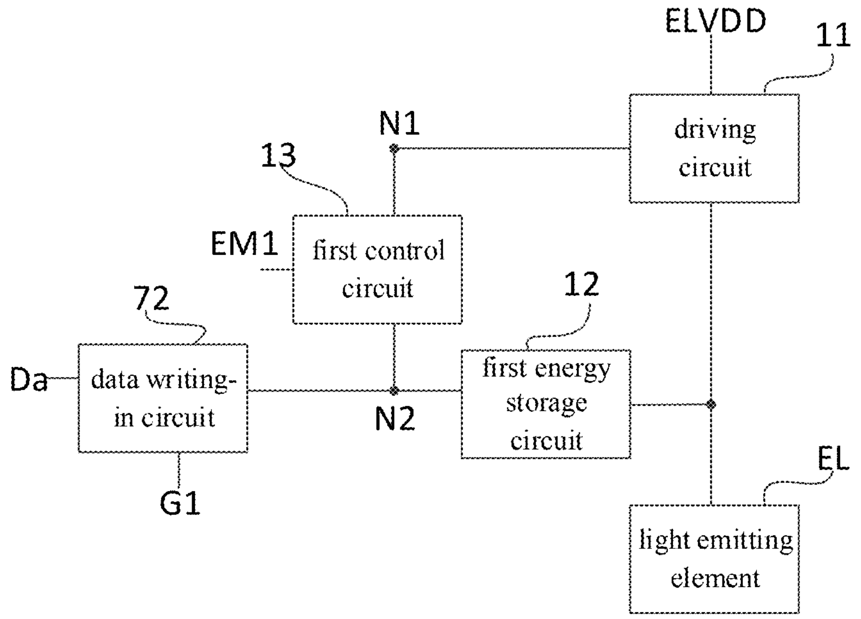
FIG. 1 is a structural diagram of a pixel circuit according to at least one embodiment of the present disclosure.

As shown in FIG. 1, the pixel circuit described in the embodiment of the present disclosure includes a light emitting element EL, a driving circuit 11, a first energy storage circuit 12, a first control circuit 13 and a data writing-in circuit 72;

A control terminal of the driving circuit 11 is electrically connected to a first node N1, a first terminal of the driving circuit 11 is electrically connected to a power supply voltage terminal ELVDD, and a second terminal of the driving circuit 11 is electrically connected to the light emitting element EL; the driving circuit 11 is configured to drive the light emitting element EL under the control of a potential of the control terminal of the driving circuit 11;

A control terminal of the first control circuit 13 is electrically connected to a first light emitting control line EM1, a first terminal of the first control circuit 13 is electrically connected to a first node N1, and a second terminal of the first control circuit 13 is electrically connected to a second node N2; the first control circuit 13 is configured to control to connect the first node N1 and the second node N2 under the control of a first light emitting control signal provided by the first light emitting control line EM1;

A first terminal of the first energy storage circuit 12 is electrically connected to the second node N2, and a second terminal of the first energy storage circuit 12 is electrically connected to the second terminal of the driving circuit 11; the first energy storage circuit 12 is configured to store electric energy;

The data writing-in circuit 72 is electrically connected to a first scanning terminal G1, the second node N2 and a data line Da respectively, and is configured to write a data voltage Vdata provided by the data line Da into the second node N2 under the control of a first scanning signal provided by the first scanning terminal G1.

When the pixel circuit described in the embodiment of the present disclosure is working, after the source-follower threshold voltage compensation is used, and, the voltage difference between the two terminals of the energy storage circuit 12 does not change under the condition that one terminal of the first energy storage circuit 12 (the first energy storage circuit 12 may include a capacitor) is floating, the threshold voltage compensation is realized.

The pixel circuit described in at least one embodiment of the present disclosure further includes a first reference voltage writing-in circuit;

The first reference voltage writing-in circuit is electrically connected to a second reset terminal and the first node respectively, and the first reference voltage writing-in circuit is also electrically connected to a reference voltage terminal or the power supply voltage terminal, is configured to write the reference voltage provided by the reference voltage terminal or a power supply voltage provided by the power voltage terminal into the first node under the control of a second reset signal provided by the second reset terminal.

In a specific implementation, the pixel circuit may further include a first reference voltage writing-in circuit, and the first reference voltage writing-in circuit writes a reference voltage or a power supply voltage into the first node under the control of the second reset signal.

Figure 2:
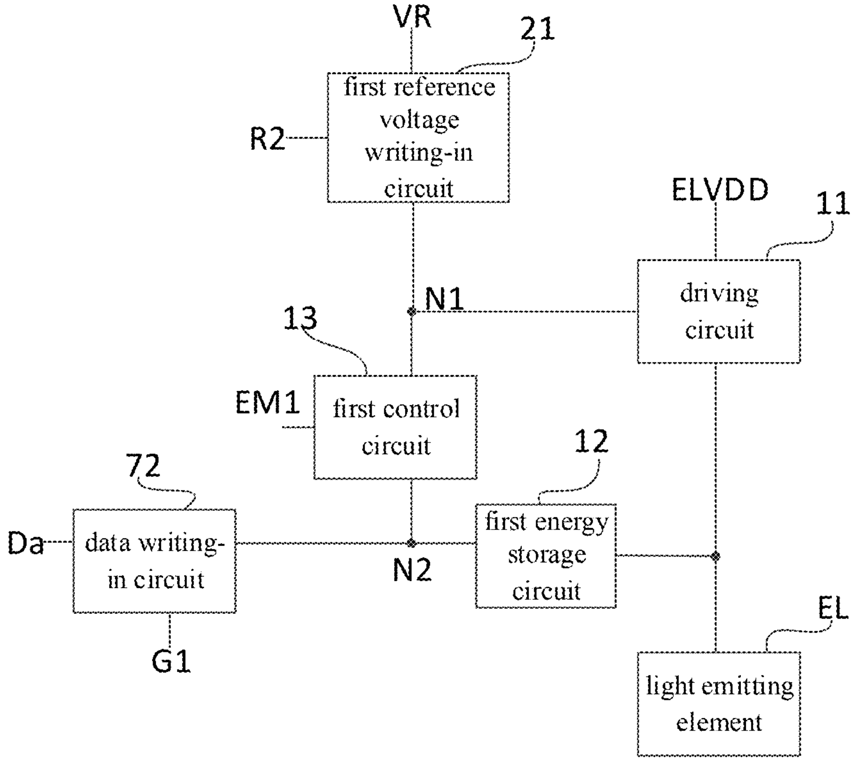
FIG. 2 is a structural diagram of a pixel circuit according to at least one embodiment of the present disclosure.

As shown in FIG. 2, on the basis of at least one embodiment of the pixel circuit shown in FIG. 1, the pixel circuit described in at least one embodiment of the present disclosure further includes a first reference voltage writing-in circuit 21;

The first reference voltage writing-in circuit 21 is electrically connected to the second reset terminal R2, the reference voltage terminal VR and the first node N1 respectively, and is configured to write the reference voltage Vref provided by the reference voltage terminal VR into the first node N1 under the control of the second reset signal provided at the second reset terminal R2.

Figure 3:
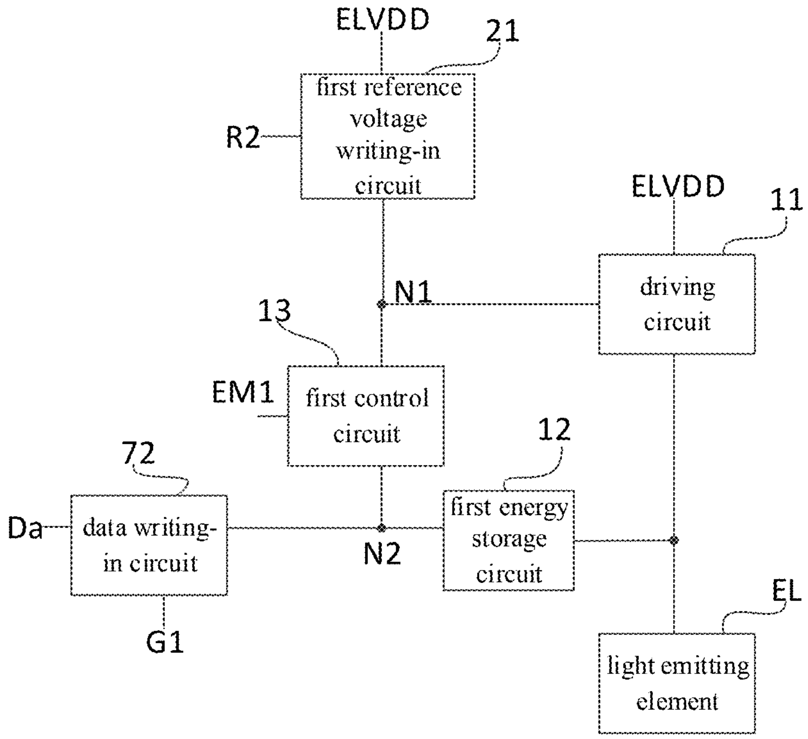
FIG. 3 is a structural diagram of a pixel circuit according to at least one embodiment of the present disclosure.

As shown in FIG. 3, based on at least one embodiment of the pixel circuit shown in FIG. 1, the pixel circuit described in at least one embodiment of the present disclosure further includes a first reference voltage writing-in circuit 21;

The first reference voltage writing-in circuit 21 is electrically connected to the second reset terminal R2, the power supply voltage terminal ELVDD and the first node N1 respectively, and is configured to write the power supply voltage provided by the power supply voltage terminal ELVDD into the first node N1 under the control of the second reset signal provided by the second reset terminal R2.

Optionally, the second reset terminal and the first scanning terminal are a same signal terminal; the pixel circuit further includes a second reference voltage writing-in circuit;

The second reference voltage writing-in circuit is respectively electrically connected to the first reset terminal, the reference voltage terminal and the first node, and is configured to write the reference voltage into the first node under the control of the first reset signal provided by the first reset terminal.

Figure 4:
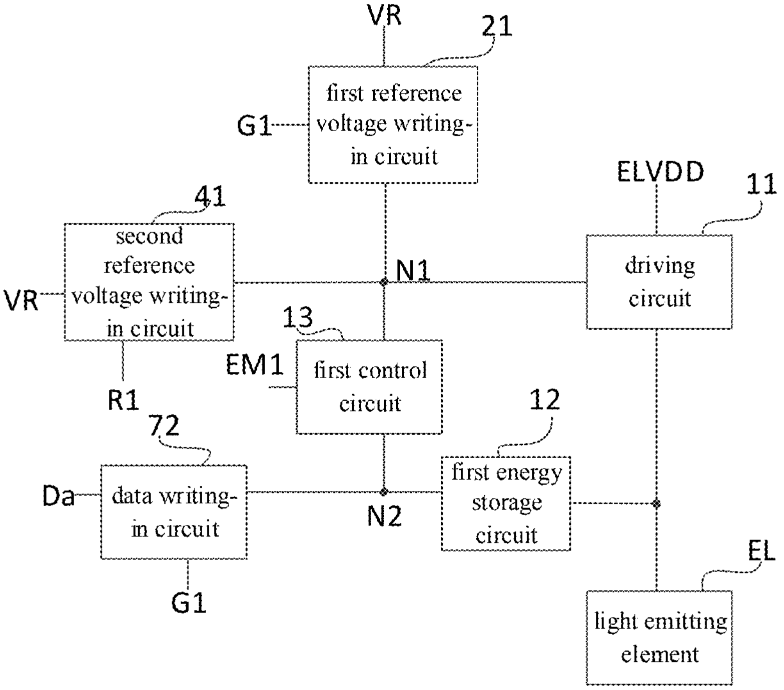
FIG. 4 is a structural diagram of a pixel circuit according to at least one embodiment of the present disclosure.

As shown in FIG. 4, on the basis of at least one embodiment of the pixel circuit shown in FIG. 2, the second reset terminal and the first scanning terminal G1 are a same signal terminal; the pixel circuit also includes a second reference voltage writing-in circuit 41;

The first reference voltage writing-in circuit 21 is electrically connected to the first scanning terminal G1, the reference voltage terminal VR and the first node N1 respectively, and is configured to write the reference voltage Vref provided by the reference voltage terminal VR into the first node N1 under the control of the second reset signal provided by the second reset terminal R2;

The second reference voltage writing-in circuit 41 is electrically connected to the first reset terminal R1, the reference voltage terminal VR and the first node N1 respectively, and is configured to write the reference voltage Vref into the first node N1 under the control of the first reset signal provided by the first reset terminal R1.

The pixel circuit described in at least one embodiment of the present disclosure further includes a first light emitting control circuit;

The first light emitting control circuit is electrically connected to the second light emitting control line, the power supply voltage terminal and the first terminal of the driving circuit, and is configured to control to connect the power supply voltage terminal and the first terminal of the driving circuit under the control of the second light emitting control signal provided by the second light emitting control line.

Figure 5:
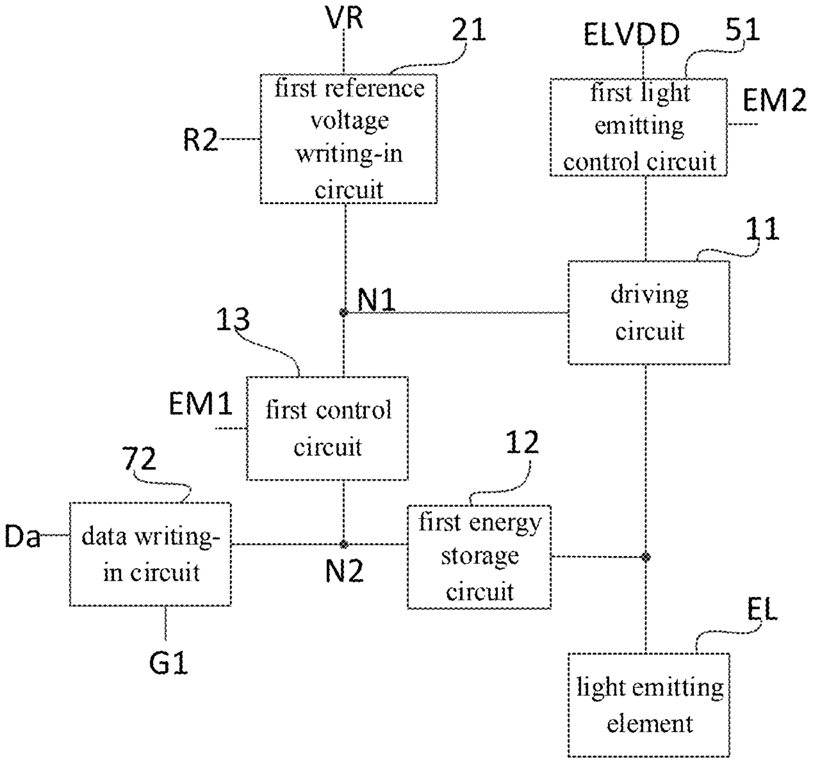
FIG. 5 is a structural diagram of a pixel circuit according to at least one embodiment of the present disclosure.

As shown in FIG. 5, on the basis of at least one embodiment of the pixel circuit shown in FIG. 2, the pixel circuit described in at least one embodiment of the present disclosure further includes a first light emitting control circuit 51;

The first light emitting control circuit 51 is electrically connected to the second light emitting control line EM2, the power supply voltage terminal ELVDD and the first terminal of the driving circuit 11 respectively, and is configured to control to connect the power supply voltage terminal ELVDD and the first terminal of the driving circuit 11 under the control of the second light emitting control signal provided by the second light emitting control line EM2.

In at least one embodiment of the present disclosure, the pixel circuit further includes a second light emitting control circuit;

The second light emitting control circuit is electrically connected to a second light emitting control line, a second terminal of the driving circuit and a first terminal of the light emitting element respectively, is configured to control to connect the second terminal of the driving circuit and the first terminal of the light emitting element under the control of the second light emitting control signal provided by the second light emitting control line.

Figure 6:
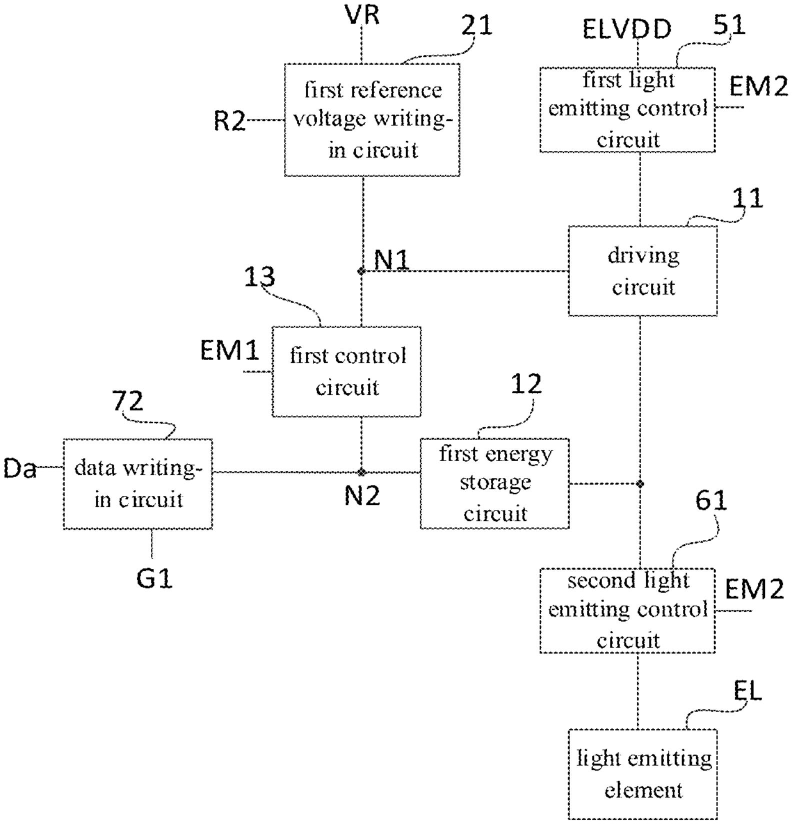
FIG. 6 is a structural diagram of a pixel circuit according to at least one embodiment of the present disclosure.

As shown in FIG. 6, on the basis of at least one embodiment of the pixel circuit shown in FIG. 5, the pixel circuit further includes a second light emitting control circuit 61;

The second light emitting control circuit 61 is respectively electrically connected to the second light emitting control line EM2, the second terminal of the second light emitting control circuit 61 and the first terminal of the light emitting element EL, is configured to control to connect the second terminal of the driving circuit 11 and the first terminal of the light emitting element EL under the control of the second light emitting control signal provided by the second light emitting control line EM2.

The pixel circuit described in at least one embodiment of the present disclosure further includes a first initialization circuit;

The first initialization circuit is electrically connected to the first reset terminal, a first reset voltage terminal and a second terminal of the driving circuit, and is configured to write the first reset voltage provided by the first reset voltage terminal into the second terminal of the driving circuit under the control of the first reset signal provided by the first reset terminal;

The first reset voltage terminal includes an initial voltage terminal, a first voltage terminal, a reference voltage terminal or a power supply voltage terminal.

In at least one embodiment of the present disclosure, the first reset voltage terminal may include an initial voltage terminal, a first voltage terminal, a reference voltage terminal or a power supply voltage terminal, and the first reset voltage may be an initial voltage, a first voltage, a reference voltage or a power supply voltage, but not limited thereto, in actual operation, the first reset voltage terminal may include other voltage terminals, and the reset voltage may be other voltage signals according to actual needs.

In at least one embodiment of the present disclosure, the first voltage terminal may be a low voltage terminal, but not limited thereto.

Optionally, the data writing-in circuit includes a tenth transistor;

A gate electrode of the tenth transistor is electrically connected to a first scanning terminal, a first electrode of the tenth transistor is electrically connected to the second node, and a second electrode of the tenth transistor is electrically connected to the data line.

Figure 7:
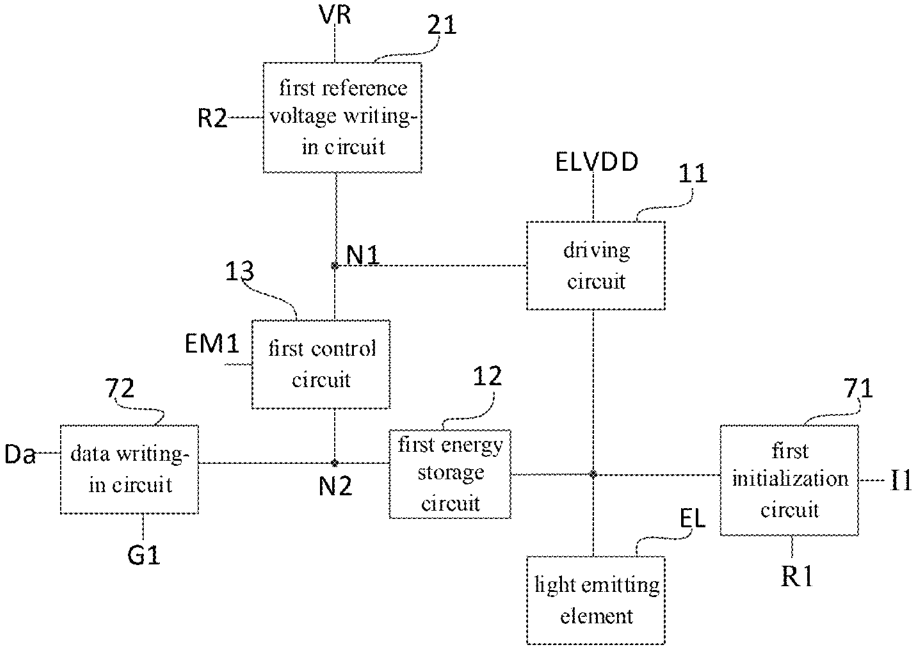
FIG. 7 is a structural diagram of a pixel circuit according to at least one embodiment of the present disclosure.

As shown in FIG. 7, on the basis of at least one embodiment of the pixel circuit shown in FIG. 2, the pixel circuit described in at least one embodiment of the present disclosure further includes a first initialization circuit 71;

The first initialization circuit 71 is electrically connected to the first reset terminal R1, the initial voltage terminal I1 and the second terminal of the driving circuit 11, respectively, and is configured to write the initial voltage Vint provided by the initial voltage terminal I1 into the second terminal of the driving circuit 11 under the control of the first reset signal provided by the first reset terminal R1.

Figure 8:
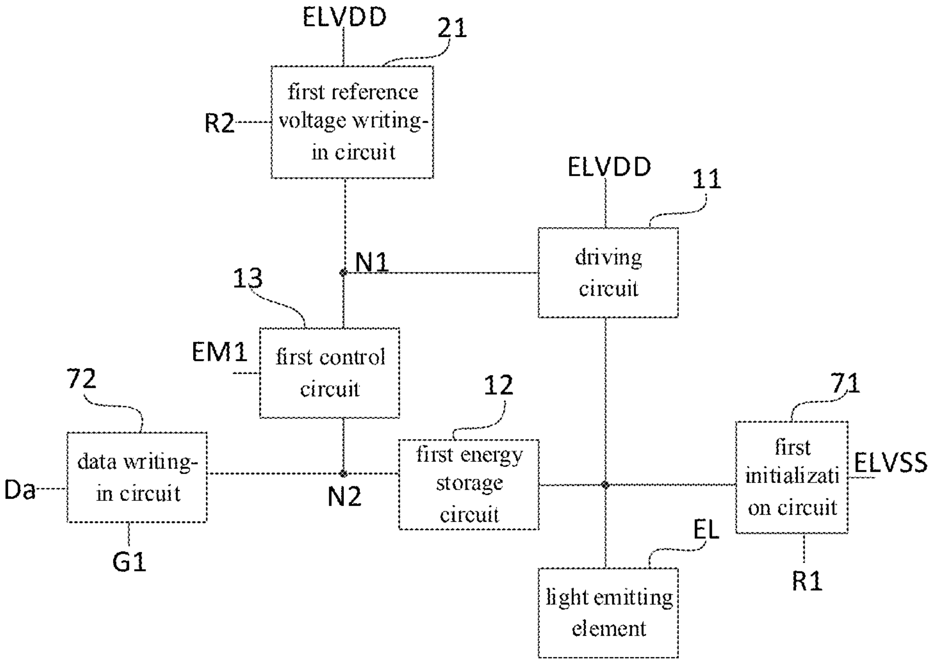
FIG. 8 is a structural diagram of a pixel circuit according to at least one embodiment of the present disclosure.

As shown in FIG. 8, on the basis of at least one embodiment of the pixel circuit shown in FIG. 3, the pixel circuit described in at least one embodiment of the present disclosure further includes a first initialization circuit 71;

The first initialization circuit 71 is electrically connected to the first reset terminal R1, the low voltage terminal ELVSS and the second terminal of the driving circuit 11, respectively, and is configured to write the low voltage signal provided by the low voltage terminal ELVSS into the second terminal of the driving circuit 11 under the control of the first reset signal provided by the first reset terminal R1.

Figure 9:
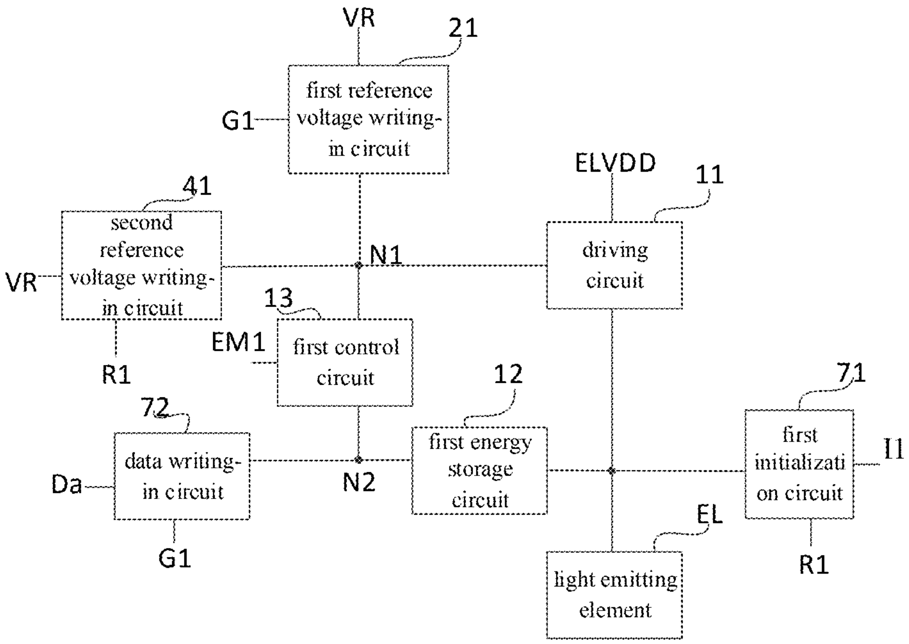
FIG. 9 is a structural diagram of a pixel circuit according to at least one embodiment of the present disclosure.

As shown in FIG. 9, on the basis of at least one embodiment of the pixel circuit shown in FIG. 4, the pixel circuit described in at least one embodiment of the present disclosure further includes a first initialization circuit 71;

The first initialization circuit 71 is electrically connected to the first reset terminal R1, the initial voltage terminal I1 and the second terminal of the driving circuit 11, respectively, and is configured to write the initial voltage Vint provided by the initial voltage terminal I1 into the second terminal of the driving circuit 11 under the control of the first reset signal provided by the first reset terminal R1.

Figure 10:
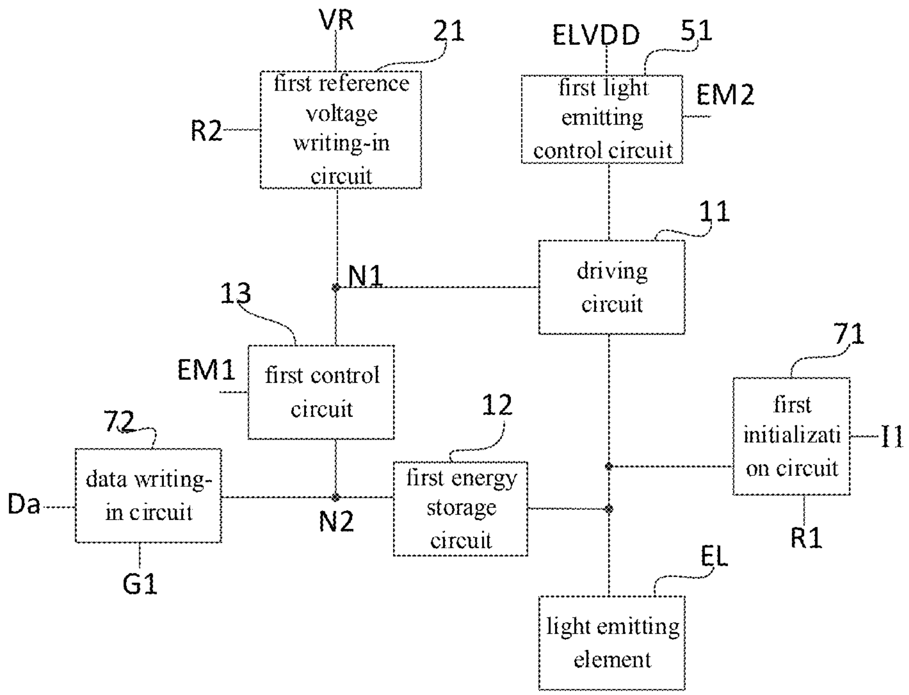
FIG. 10 is a structural diagram of a pixel circuit according to at least one embodiment of the present disclosure.

As shown in FIG. 10, on the basis of at least one embodiment of the pixel circuit shown in FIG. 5, the pixel circuit described in at least one embodiment of the present disclosure further includes a first initialization circuit 71;

The first initialization circuit 71 is electrically connected to the first reset terminal R1, the initial voltage terminal I1 and the second terminal of the driving circuit 11, respectively, and is configured to write the initial voltage Vint provided by the initial voltage terminal I1 into the second terminal of the driving circuit 11 under the control of the first reset signal provided by the first reset terminal R1.

Figure 11:
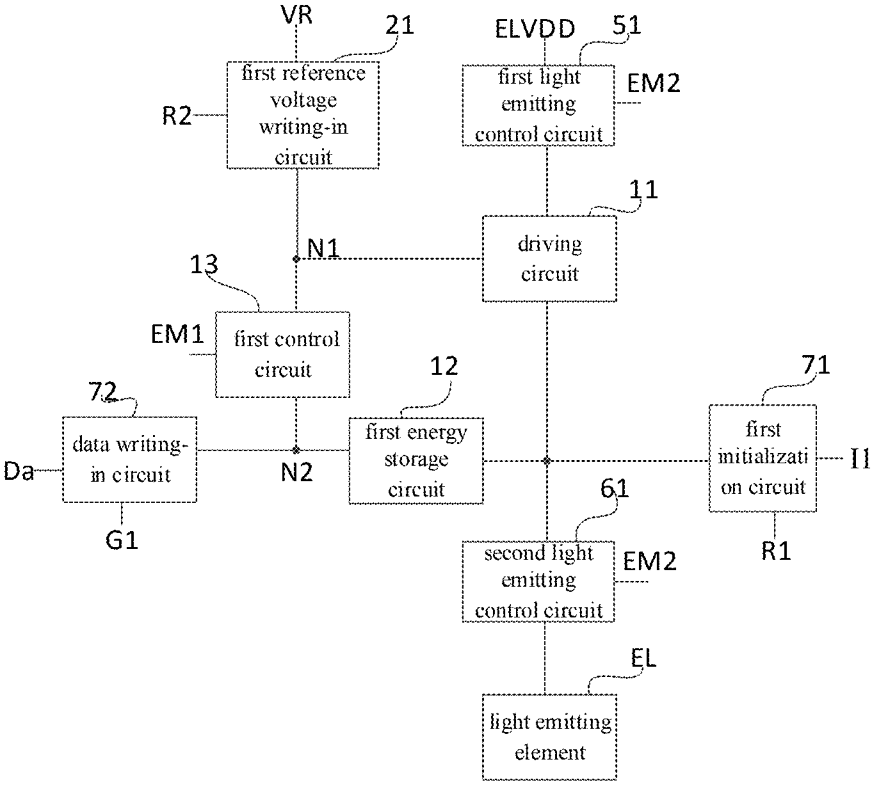
FIG. 11 is a structural diagram of a pixel circuit according to at least one embodiment of the present disclosure.

As shown in FIG. 11, on the basis of at least one embodiment of the pixel circuit shown in FIG. 6, the pixel circuit described in at least one embodiment of the present disclosure further includes a first initialization circuit 71;

The first initialization circuit 71 is electrically connected to the first reset terminal R1, the initial voltage terminal I1 and the second terminal of the driving circuit 11, respectively, and is configured to write the initial voltage Vint provided by the initial voltage terminal I1 into the second terminal of the driving circuit 11 under the control of the first reset signal provided by the first reset terminal R1.

Optionally, the driving circuit includes a driving transistor, the first control circuit includes a first transistor, and the first energy storage circuit includes a first capacitor;

A gate electrode of the first transistor is electrically connected to the first light emitting control line, a first electrode of the first transistor is electrically connected to the first node, and a second electrode of the first transistor is electrically connected to the second node;

A gate electrode of the driving transistor is electrically connected to the first node, a first electrode of the driving transistor is electrically connected to the power supply voltage terminal, and a second electrode of the driving transistor is electrically connected to the light emitting element;

A first terminal of the first capacitor is electrically connected to the second node, and a second terminal of the first capacitor is electrically connected to a second electrode of the driving transistor.

Optionally, the first reference voltage writing-in circuit includes the second transistor;

A gate electrode of the second transistor is electrically connected to the second reset terminal, a first electrode of the second transistor is electrically connected to the reference voltage terminal, and a second electrode of the second transistor is electrically connected to the first node; or, A gate electrode of the second transistor is electrically connected to the second reset terminal, a first electrode of the second transistor is electrically connected to the power supply voltage terminal, and a second electrode of the second transistor is electrically connected to the first node;

Optionally, the second reference voltage writing-in circuit includes a third transistor;

A gate electrode of the third transistor is electrically connected to the first reset terminal, a first electrode of the third transistor is electrically connected to the reference voltage terminal, and a second electrode of the third transistor is electrically connected to the first node.

Optionally, the first light emitting control circuit includes a fourth transistor;

A gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit;

The second light emitting control circuit includes a fifth transistor;

A gate electrode of the fifth transistor is electrically connected to the second light emitting control line, a first electrode of the fifth transistor is electrically connected to the second terminal of the driving circuit, a second electrode of the fifth transistor is electrically connected to the first terminal of the light emitting element.

Optionally, the first initialization circuit includes a sixth transistor;

A gate electrode of the sixth transistor is electrically connected to the first reset terminal, a first electrode of the sixth transistor is electrically connected to the initial voltage terminal, the first voltage terminal, the reference voltage terminal or the power supply voltage terminal, and a second electrode of the sixth transistor is electrically connected to the second terminal of the driving circuit.

Figure 12:
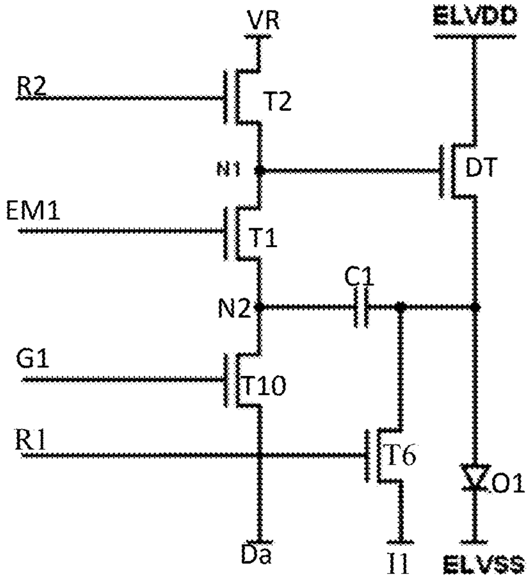
FIG. 12 is a circuit diagram of a pixel circuit according to at least one embodiment of the present disclosure.

As shown in FIG. 12, on the basis of at least one embodiment of the pixel circuit shown in FIG. 7, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

The first terminal of the first capacitor C1 is electrically connected to the second node N2, and the second terminal of the first capacitor C1 is electrically connected to the source electrode of the driving transistor DT;

The first reference voltage writing-in circuit includes a second transistor T2;

The gate electrode of the second transistor T2 is electrically connected to the second reset terminal R2, the source electrode of the second transistor T2 is electrically connected to the reference voltage terminal VR, and the drain electrode of the second transistor T2 is electrically connected to the first node N1;

The first initialization circuit includes a sixth transistor T6;

The gate electrode of the sixth transistor T6 is electrically connected to the first reset terminal R1, the source electrode of the sixth transistor T6 is electrically connected to the initial voltage terminal I1, and the drain electrode of the sixth transistor T6 is electrically connected to the source electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 12, all transistors are n-type transistors, but not limited thereto.

Figure 13:
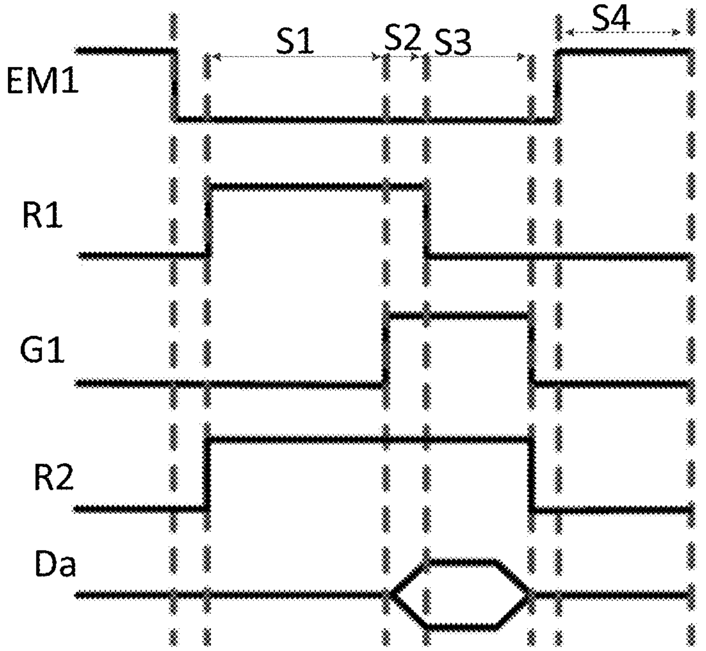
FIG. 13 is a working timing diagram of the pixel circuit shown in FIG. 12.

As shown in FIG. 13, when at least one embodiment of the pixel circuit shown in FIG. 12 is working, the display period includes a first phase S1, a second phase S2, a third phase S3 and a fourth phase S4 set in sequence;

In the first phase S1, EM1 provides a low voltage signal, R1 provides a high voltage signal, G1 provides a low voltage signal, R2 provides a high voltage signal, T2 is turned on, and T6 is turned on to write the reference voltage Vref provided by VR into the gate electrode of DT, write the initial voltage Vint provided by I1 into the source electrode of DT, reset the gate potential of DT, the anode potential of O1 and the potential of the source electrode of DT;

In the second phase S2, EM1 provides a low voltage signal, R1 provides a high voltage signal, G1 provides a high voltage signal, R2 provides a high voltage signal, T6, T10 and T2 are all turned on to write the data voltage Vdata provided by the data line Da into the second node N2, write the reference voltage Vref provided by the reference voltage terminal VR into the first node N1, and write the initial voltage Vin provided by the initial voltage terminal I1 into the source electrode of the DT;

In the third phase S3, EM1 provides a low voltage signal, R1 provides a low voltage signal, G1 provides a high voltage signal, R2 provides a high voltage signal, and Da provides the data voltage Vdata. At this time, T6 is turned off, T2 is turned on, T10 is turned on, and the gate potential of DT is Vref;

At the beginning of the third phase S3, DT is turned on to charge C1 and increase the potential of the source electrode of DT until the potential of the source electrode of DT becomes Vref−Vth, and DT is turned off;

In the fourth phase S4, EM1 provides a high voltage signal, T1 and DT are turned on, and the potential of N1 is equal to that of N2. Since N1 is in a floating state, the voltage difference across C1 remains unchanged before and after DT is turned on. At this time, the difference between the potential of the first node and the potential of the source electrode of DT is Vdata−Vref+Vth, the gate-source voltage of DT is Vdata−Vref+Vth, and the current flowing through O1 is $K(Vdata-Vref)^2$; the above formula shows that since Vref is a fixed voltage, the drain-source current Ids supplied to O1 can be determined correspondingly from the data voltage Vdata; the current flowing through O1 is not related to the threshold voltage of the driving transistor and the power supply voltage provided by ELVDD, and the threshold voltage compensation can be implemented.

At least one embodiment of the pixel circuit shown in FIG. 12 of the present disclosure is working, in the second phase S2, both R1 and G1 provide a high voltage signal, T6 is turned on, and T10 is turned on, so as to write the data voltage Vdata provided by the data line Da into the second node N2, and control the potential of the second terminal of C1 to be the initial voltage Vint.

In at least one embodiment of the present disclosure, in the second phase S2, the first reset signal provided by R1 and the first scanning signal provided by G1 are the high voltage signal at the same time, so as to prevent T6 from being turned on first, so that after the initial voltage Vint provided by I1 is applied to N2, T10 is turned on to apply the data voltage provided by Da to N1. At this time, the potential of N2 will change due to C1, so that it cannot be maintained at Vint; and in the embodiment of the present disclosure, in the second phase S2, T6 and T10 are turned on at the same time, the above problems will not occur.

Moreover, in at least one embodiment of the present disclosure, the time for which the first reset signal provided by R1 remains at the high level may be the same as the time for which the first scanning signal provided by G1 remains at the high level, that is, the first scanning signal may be delayed by a predetermined time to the first reset signal, which can reduce the use of one Gate On Array (GOA, a gate driving circuit arranged on the array substrate), and the first reset signal and the first scanning signal are simultaneously provided through one GOA.

Figure 14:
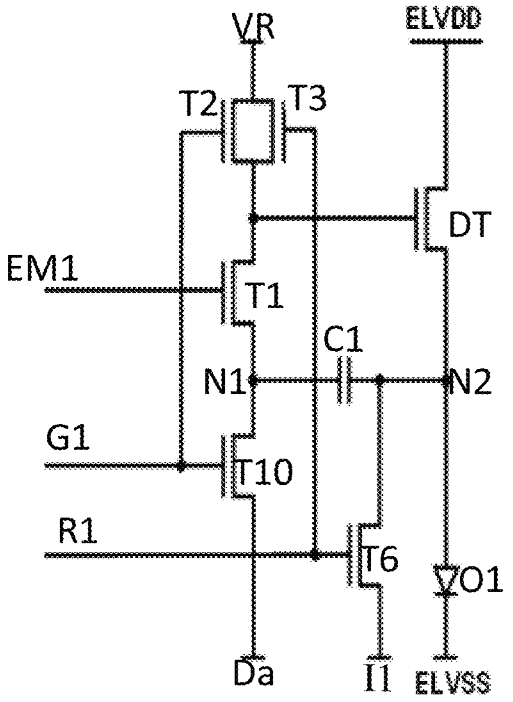
FIG. 14 is a circuit diagram of a pixel circuit according to at least one embodiment of the present disclosure.

As shown in FIG. 14, on the basis of at least one embodiment of the pixel circuit shown in FIG. 9, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

The first terminal of the first capacitor C1 is electrically connected to the second node N2, and the second terminal of the first capacitor C1 is electrically connected to the source electrode of the driving transistor DT;

The first reference voltage writing-in circuit includes a second transistor T2;

The gate electrode of the second transistor T2 is electrically connected to the first scanning terminal G1, the source electrode of the second transistor T2 is electrically connected to the reference voltage terminal VR, and the drain electrode of the second transistor T2 is electrically connected to the first node N1;

The second reference voltage writing-in circuit includes a third transistor T3;

The gate electrode of the third transistor T3 is electrically connected to the first reset terminal R1, the source electrode of the third transistor T3 is electrically connected to the reference voltage terminal VR, and the drain electrode of the third transistor T3 is electrically connected to the first node N1;

The first initialization circuit includes a sixth transistor T6;

The gate electrode of the sixth transistor T6 is electrically connected to the first reset terminal R1, the source electrode of the sixth transistor T6 is electrically connected to the initial voltage terminal I1, and the drain electrode of the sixth transistor T6 is electrically connected to the source electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 14, all transistors are n-type transistors, but not limited thereto.

In at least one embodiment of the pixel circuit shown in FIG. 14, the gate electrode of T2 is controlled by the first scanning signal provided by G1, and T3 is controlled by the first reset signal provided by R1, and as compared with the pixel circuit shown in FIG. 12, at least one embodiment of the pixel circuit shown in FIG. 14 reduces the use of one control signal (the second reset signal provided by R2), which can reduce the use of a group of GOA, only three groups of GOAs are required.

Figure 15:
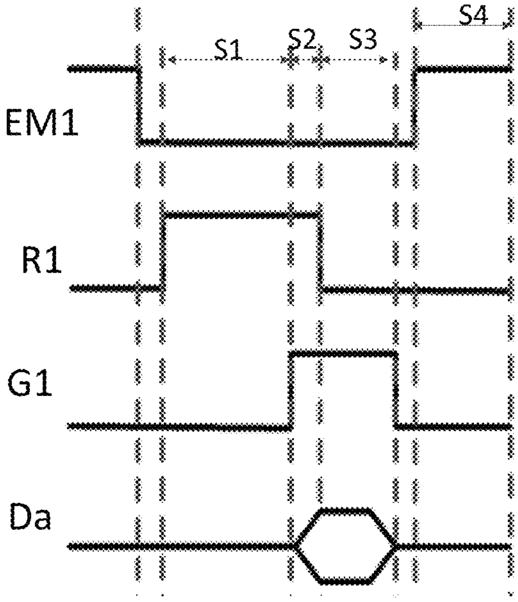
FIG. 15 is a working timing diagram of the pixel circuit shown in FIG. 14.

FIG. 15 is a working timing diagram of the pixel circuit shown in FIG. 14.

When at least one embodiment of the pixel circuit shown in FIG. 14 of the present disclosure is working, In the second phase S2 and the third phase S3, G1 outputs a high voltage signal, T2 and T10 are turned on;

In the first phase S1 and the second phase S2, R1 outputs a high voltage signal, and T3 and T6 are turned on.

Figure 16:
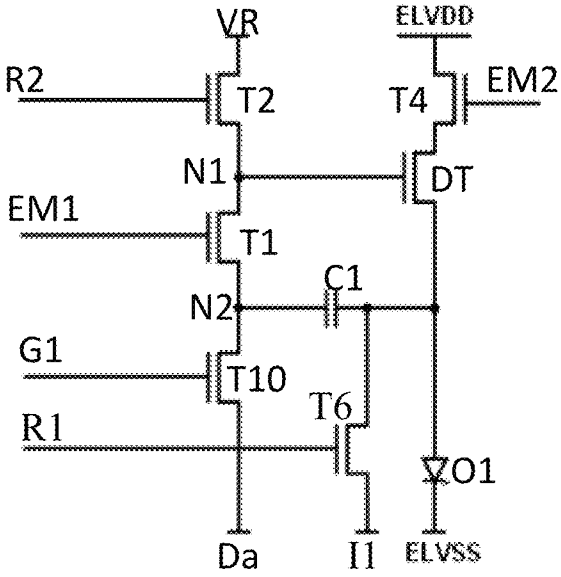
FIG. 16 is a circuit diagram of a pixel circuit according to at least one embodiment of the present disclosure.

As shown in FIG. 16, on the basis of at least one embodiment of the pixel circuit shown in FIG. 10, The driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The first light emitting control circuit includes a fourth transistor T4;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the source electrode of the driving transistor DT is electrically connected to the anode of the organic light emitting diode O1; the cathode of the organic light emitting diode O1 is electrically connected to the low voltage terminal ELVSS;

The first terminal of the first capacitor C1 is electrically connected to the second node N2, and the second terminal of the first capacitor C1 is electrically connected to the source electrode of the driving transistor DT;

The first reference voltage writing-in circuit includes the second transistor T2;

The gate electrode of the second transistor T2 is electrically connected to the second reset terminal R2, the source electrode of the second transistor T2 is electrically connected to the reference voltage terminal VR, and the drain electrode of the second transistor T2 is electrically connected to the first node N1;

The first initialization circuit includes a sixth transistor T6;

The gate electrode of the sixth transistor T6 is electrically connected to the first reset terminal R1, the source electrode of the sixth transistor T6 is electrically connected to the initial voltage terminal I1, and the drain electrode of the sixth transistor T6 is electrically connected to the source electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 16, all transistors are n-type transistors, but not limited thereto.

Figure 17:
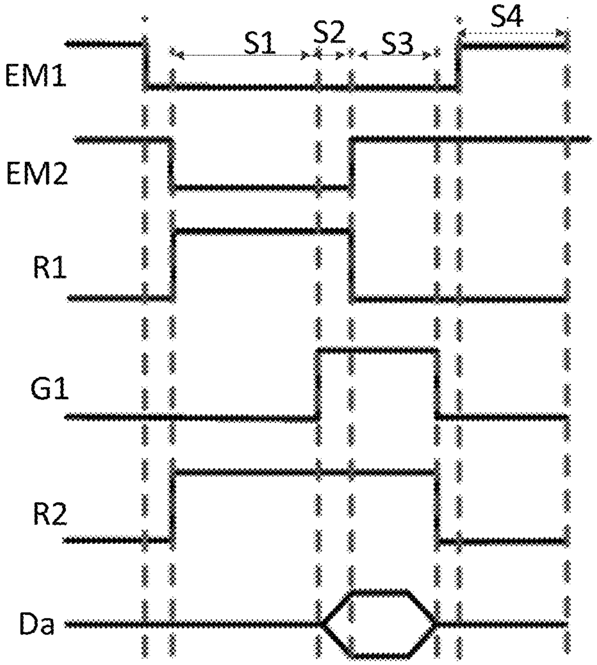
FIG. 17 is a working timing diagram of the pixel circuit shown in FIG. 16.

FIG. 17 is a working timing diagram of the pixel circuit shown in FIG. 16.

In at least one embodiment of the pixel circuit shown in FIG. 16 of the present disclosure, a fourth transistor T4 is added, and the potential of the second light emitting control signal provided by EM2 is at a low voltage during the period when the potential of the first reset signal provided by R1 is a high voltage, that is, the second light emitting control signal provided by EM2 is inverse in phase to the first reset signal provided by R1. In the phase of initializing the anode potential of O1, it prevents the formation of a current path between DT and T6. At the same time, Vint can also be used to reset the anode potential of O1 in a better way.

As shown in FIG. 17, when at least one embodiment of the pixel circuit shown in FIG. 16 of the present disclosure is working, the display period includes the first phase S1, the second phase S2, the third phase S3 and the fourth phase S4 set successively;

In the first phase S1, EM1 provides a low voltage signal, EM2 provides a low voltage signal, R1 provides a high voltage signal, G1 provides a low voltage signal, R2 provides a high voltage signal, T1 and T4 are turned off, T2 is turned on, and T6 is turned on to write the reference voltage Vref provided by VR into the gate electrode of DT, write the initial voltage Vint provided by I1 into the source electrode of DT, and reset the gate potential of DT, the anode potential of O1 and the potential of the source electrode of DT;

In the second phase S2, EM1 provides a low voltage signal, EM2 provides a low voltage signal, R1 provides a high voltage signal, G1 provides a high voltage signal, R2 provides a high voltage signal, T6, T1 and T4 are turned off, T10 and T2 are all turned on, to write the data voltage Vdata provided by the data line Da into the second node N2, write the reference voltage Vref provided by the reference voltage terminal VR into the first node N1, and write the initial voltage Vin provided by the initial voltage terminal I1 into the source electrode of DT;

In the third phase S3, EM1 provides a low voltage signal, EM2 provides a high voltage signal, R1 provides a low voltage signal, G1 provides a high voltage signal, R2 provides a high voltage signal, and Da provides the data voltage Vdata. At this time, T6 is turned off and T2 is turned on, T10 is turned on, the gate potential of DT is Vref; T4 is turned on, and the drain electrode of DT is electrically connected to ELVDD;

At the beginning of the third phase S3, DT is turned on to charge C1 and increase the potential of the source electrode of DT until the potential of the source electrode of DT becomes Vref−Vth, and DT is turned off;

In the fourth phase S4, EM1 provides a high voltage signal, EM2 provides a high voltage signal, T1, T4, and DT are turned on, and the drain electrode of DT is electrically connected to ELVDD, and the potential of N1 is equal to that of N2. Since N1 is in a floating state, before and after DT is turned on, the voltage difference across C1 remains unchanged. At this time, the potential difference between the potential of the first node and the potential of the source electrode of DT is Vdata−Vref+Vth, and the gate-source voltage of DT is Vdata−Vref+Vth, the current flowing through O1 is $K(Vdata-Vref)^2$; from the above formula, since Vref is a fixed voltage, the drain-source current Ids supplied to O1 can be determined correspondingly to the data voltage Vdata; the current flowing through O1 is not related to the threshold voltage of the driving transistor and the power supply voltage supplied by ELVDD, the threshold voltage compensation is implemented.

Figure 18:
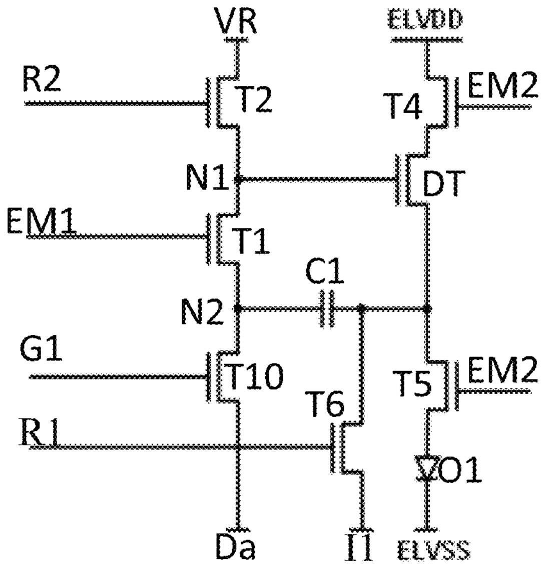
FIG. 18 is a circuit diagram of a pixel circuit according to at least one embodiment of the present disclosure.

As shown in FIG. 18, on the basis of at least one embodiment of the pixel circuit shown in FIG. 11, the driving circuit includes a driving transistor DT, the first control circuit includes a first transistor T1, and the first energy storage circuit includes a first capacitor C1; the light emitting element is an organic light emitting diode O1;

The driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the power supply voltage terminal ELVDD, and the drain electrode of the first transistor T1 is electrically connected to the first node N1;

The first light emitting control circuit includes a fourth transistor T4;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1;

The first terminal of the first capacitor C1 is electrically connected to the second node N2, and the second terminal of the first capacitor C1 is electrically connected to the source electrode of the driving transistor DT;

The second light emitting control circuit includes a fifth transistor T5;

The gate electrode of the fifth transistor T5 is electrically connected to the second light emitting control line EM2, the source electrode of the fifth transistor T5 is electrically connected to the source electrode of the driving transistor DT, and the drain electrode of the fifth transistor T5 is electrically connected to the anode of the organic light emitting diode O1; the cathode of the organic light emitting diode O1 is electrically connected to the low voltage terminal ELVSS;

The first reference voltage writing-in circuit includes a second transistor T2;

The gate electrode of the second transistor T2 is electrically connected to the second reset terminal R2, the source electrode of the second transistor T2 is electrically connected to the reference voltage terminal VR, and the drain electrode of the second transistor T2 is electrically connected to the first node N1;

The first initialization circuit includes a sixth transistor T6;

The gate electrode of the sixth transistor T6 is electrically connected to the first reset terminal R1, the source electrode of the sixth transistor T6 is electrically connected to the initial voltage terminal I1, and the drain electrode of the sixth transistor T6 is electrically connected to the source electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 18, all transistors are n-type transistors, but not limited thereto.

Figure 19:
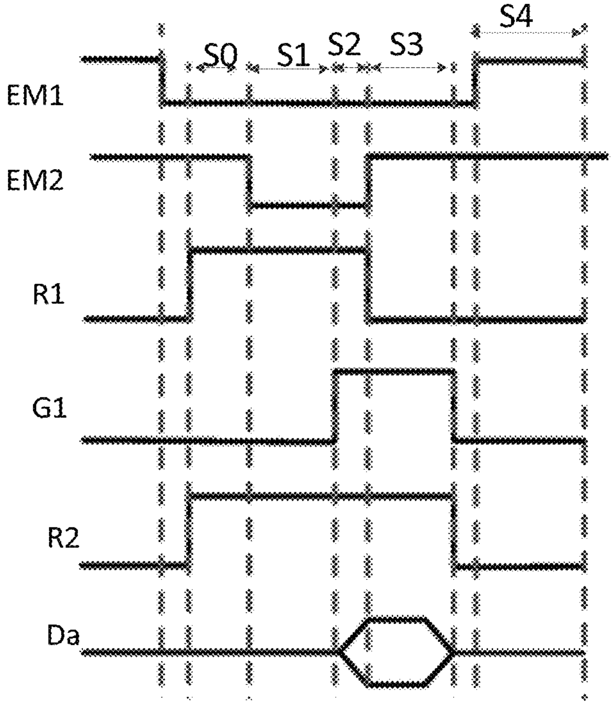
FIG. 19 is a working timing diagram of the pixel circuit shown in FIG. 18.

FIG. 19 is a working timing diagram of the pixel circuit shown in FIG. 18.

As compared with at least one embodiment of the pixel circuit shown in FIG. 16, at least one embodiment of the pixel circuit shown in FIG. 18 adds a fifth transistor T5; and, there is an overlapping time period between the time period that the potential of the second light emitting control signal provided by EM2 is a high voltage and the time period that the potential of the first reset signal provided by R1 is a high voltage. In this overlapping time period, T6, T4 and T5 are all turned on. At this time, Vint can reset the potential of the anode of O1; during the time period that the T5 is turned off, the anode potential of O1 remains at Vint, even if the source voltage of DT is Vref−Vth during the threshold voltage compensation period, it will not affect the turn-on sequence of the red pixel circuit, the green pixel circuit and the blue pixel circuit.

As shown in FIG. 19, when at least one embodiment of the pixel circuit shown in FIG. 18 is working, the display period includes a pre-phase phase 50, the first phase S1, the second phase S2, the third phase S3 and the fourth phase S4 set successively;

In the pre-phase 50, EM1 provides a low voltage signal, EM2 provides a high voltage signal, R1 provides a high voltage signal, G1 provides a low voltage signal, R2 provides a high voltage signal, T1 is turned off, T4 is turned on, T6 is turned on, T10 is turned off, T2 is turned on to write the reference voltage Vref provided by VR into the first node N1, control the electrical connection between the drain electrode of DT and ELVDD, and write the initial voltage Vint provided by I1 into the source electrode of DT;

In the first phase S1, EM1 provides a low voltage signal, EM2 provides a low voltage signal, R1 provides a high voltage signal, G1 provides a low voltage signal, R2 provides a high voltage signal, T1, T4 and T5 are turned off, T2 is turned on, T6 is turned on to write the reference voltage Vref provided by VR into the gate electrode of DT, write the initial voltage Vint provided by I1 into the source electrode of DT, and reset the gate potential of DT, the anode potential of O1 and the potential of the source electrode of DT;

In the second phase S2, EM1 provides a low voltage signal, EM2 provides a low voltage signal, R1 provides a high voltage signal, G1 provides a high voltage signal, R2 provides a high voltage signal, T6, T1, T4 and T5 are turned off, T10 and T2 are all turned on to write the data voltage Vdata provided by the data line Da into the second node N2, write the reference voltage Vref provided by the reference voltage terminal VR into the first node N1, and write the initial voltage Vin provided by the initial voltage terminal I1 into the source electrode of DT;

In the third phase S3, EM1 provides a low voltage signal, EM2 provides a high voltage signal, R1 provides a low voltage signal, G1 provides a high voltage signal, R2 provides a high voltage signal, and Da provides the data voltage Vdata. At this time, T6 is turned off and T2 is turned on, T10 is turned on, the gate potential of DT is Vref; T4 and T5 are turned on, the drain electrode of DT is electrically connected to ELVDD, and the source electrode of DT is electrically connected to the anode of O1;

At the beginning of the third phase S3, DT is turned on to charge C1 and increase the potential of the source electrode of DT until the potential of the source electrode of DT becomes Vref−Vth, and DT is turned off;

In the fourth phase S4, EM1 provides a high voltage signal, EM2 provides a high voltage signal, T1, T4, T5 and DT are turned on, the drain electrode of DT is electrically connected to ELVDD, the source electrode of DT is electrically connected to the anode of O1, and the potential of N1 is equal to the potential of N2. Since N1 is in a floating state, the voltage difference across C1 remains unchanged before and after DT is turned on. At this time, the potential difference between the potential of the first node and the potential of the source electrode of DT is Vdata−Vref+Vth, the gate-source voltage of DT is Vdata−Vref+Vth, and the current flowing through O1 is $K(Vdata-Vref)^2$; from the above formula, since Vref is a fixed voltage, the drain-source current Ids applied to O1 can be determined correspondingly by the data voltage Vdata; the current flowing through O1 is not related to the threshold voltage of the driving transistor and the power supply voltage provided by ELVDD, and threshold voltage compensation can be performed.

Figure 20:
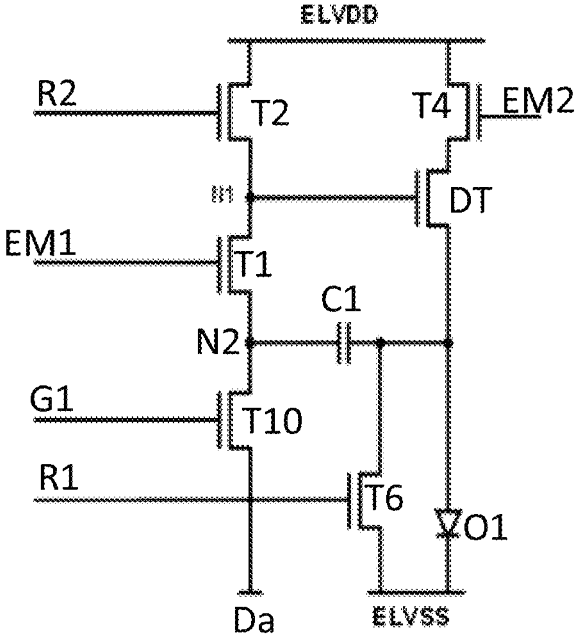
FIG. 20 is a circuit diagram of a pixel circuit according to at least one embodiment of the present disclosure.

As shown in FIG. 20, on the basis of at least one embodiment of the pixel circuit shown in FIG. 8, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the power supply voltage terminal ELVDD, and the drain electrode of the first transistor T1 is electrically connected to the first node N1;

The first light emitting control circuit includes a fourth transistor T4;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the source electrode of the driving transistor DT is electrically connected to the anode of the organic light emitting diode O1; the cathode of the organic light emitting diode O1 is electrically connected to the low voltage terminal ELVSS;

The first terminal of the first capacitor C1 is electrically connected to the second node N2, and the second terminal of the first capacitor C1 is electrically connected to the source electrode of the driving transistor DT;

The first reference voltage writing-in circuit includes a second transistor T2;

The gate electrode of the second transistor T2 is electrically connected to the second reset terminal R2, the source electrode of the second transistor T2 is electrically connected to the power supply voltage terminal ELVDD, and the drain electrode of the second transistor T2 is electrically connected to the first node N1;

The first initialization circuit includes a sixth transistor T6;

The gate electrode of the sixth transistor T6 is electrically connected to the first reset terminal R1, the source electrode of the sixth transistor T6 is electrically connected to the low voltage terminal ELVSS, and the drain electrode of the sixth transistor T6 is electrically connected to the source electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 20, all transistors are n-type transistors, but not limited thereto.

Figure 21:
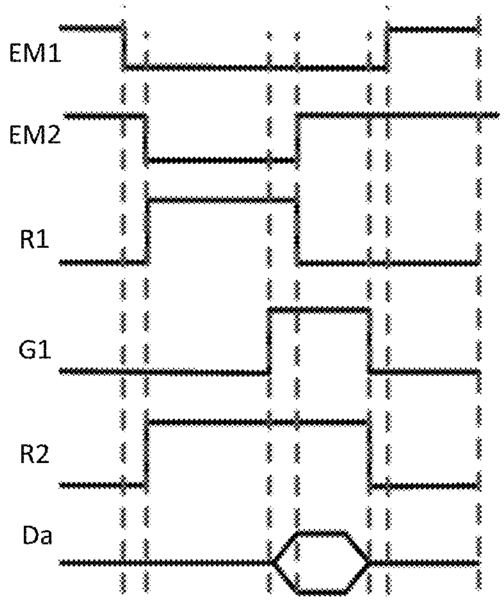
FIG. 21 is a working timing diagram of the pixel circuit shown in FIG. 20.

FIG. 21 is a working timing diagram of the pixel circuit shown in FIG. 20.

In at least one embodiment of the pixel circuit shown in FIG. 20, the source electrode of T2 is electrically connected to the power supply voltage terminal ELVDD, and the drain electrode of T6 is electrically connected to the low voltage terminal ELVSS, which can save two additional voltage lines and is beneficial to layout design.

Optionally, the pixel circuit described in at least one embodiment of the present disclosure further includes a second energy storage circuit and a second initialization circuit;

A second terminal of the first energy storage circuit is electrically connected to the second terminal of the driving circuit through the second energy storage circuit;

A first terminal of the second energy storage circuit is electrically connected to a third node, a second terminal of the second energy storage circuit is electrically connected to the second terminal of the driving circuit, and the second energy storage circuit is configured to store electrical energy;

The second initialization circuit is electrically connected to the scanning terminal, the second terminal of the driving circuit, and the second reset voltage terminal, and is configured to control to connect the second terminal of the driving circuit and the second reset voltage terminal under the control of the scanning signal provided by the scanning terminal;

The second reset voltage terminal includes the initial voltage terminal, the first voltage terminal or the third node;

The scanning terminal includes a first scanning terminal or a second scanning terminal.

In at least one embodiment of the present disclosure, the second reset voltage terminal may include an initial voltage terminal, a first voltage terminal or a third node, and the second reset voltage provided by the second reset voltage terminal may be the initial voltage, the first voltage or the potential of the third node, but not limited thereto; in actual operation, the second reset voltage terminal can be other voltage terminals, and the second reset voltage can be other voltage signals according to actual needs.

Optionally, the pixel circuit described in at least one embodiment of the present disclosure may further include a second energy storage circuit, a first reference voltage writing-in circuit, a data writing-in circuit, and a first initialization circuit;

The second node is electrically connected to the first node through the second energy storage circuit;

The first reference voltage writing-in circuit is respectively electrically connected to the reset terminal, the reference voltage terminal and the first node, and is configured to write the reference voltage provided by the reference voltage terminal into the first node under the control of the reset signal provided by the reset terminal;

The data writing-in circuit is electrically connected to the first scanning terminal, the second node and the data line respectively, and is configured to write the data voltage provided by the data line into the second node under the control of the first scanning signal provided by the first scanning terminal;

The first initialization circuit is electrically connected to the reset terminal, the initial voltage terminal, and the second terminal of the driving circuit, and is configured to write the initial voltage provided by the initial voltage terminal into the second terminal of the driving circuit under the control of the reset signal provided by the reset terminal.

Figure 22:
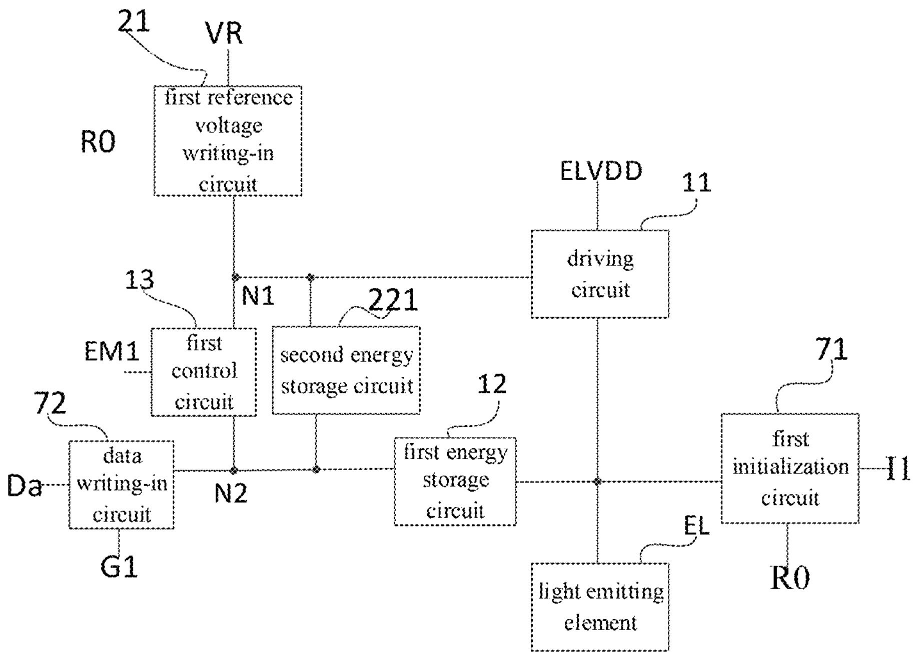
FIG. 22 is a structural diagram of a pixel circuit according to at least one embodiment of the present disclosure.

As shown in FIG. 22, based on the embodiment of the pixel circuit shown in FIG. 1, the pixel circuit described in at least one embodiment of the present disclosure further includes a second energy storage circuit 221, a first reference voltage writing-in circuit 21, a data writing-in circuit 72 and a first initialization circuit 71;

The second node N2 is electrically connected to the first node N1 through the second energy storage circuit 221;

The first reference voltage writing-in circuit 21 is electrically connected to the reset terminal R0, the reference voltage terminal VR and the first node N1 respectively, and is configured to write the reference voltage Vref provided by the reference voltage terminal VR into the first node N1 under the control of the reset signal provided by the reset terminal R0;

The data writing-in circuit 72 is electrically connected to the first scanning terminal G1, the second node N2 and the data line Da respectively, and is configured to write the data voltage Vdata provided by the data line Da into the second node N2 under the control of the first scanning signal provided by the first scanning terminal G1;

The first initialization circuit 71 is electrically connected to the reset terminal R0, the initial voltage terminal I1, and the second terminal of the driving circuit 11 respectively, and is configured to write the initial voltage Vint provided by the initial voltage terminal I1 into the second terminal of the driving circuit 11 under the control of the reset signal provided by the reset terminal R0.

Optionally, the first energy storage circuit includes a first capacitor, the second energy storage circuit includes a second capacitor, the first control circuit includes a first transistor, and the first reference voltage writing-in circuit includes an eighth transistor, the data writing-in circuit includes an eleventh transistor, the first initialization circuit includes a seventh transistor; the driving circuit includes a driving transistor;

A gate electrode of the first transistor is electrically connected to the first light emitting control line, a first electrode of the first transistor is electrically connected to the first node, and a second electrode of the first transistor is electrically connected to the second node;

A gate electrode of the driving transistor is electrically connected to the first node, a first electrode of the driving transistor is electrically connected to the power supply voltage terminal, and a second electrode of the driving transistor is electrically connected to the light emitting element;

A first terminal of the first capacitor is electrically connected to the second node, and a second terminal of the first capacitor is electrically connected to the second electrode of the driving transistor;

A first terminal of the second capacitor is electrically connected to the first node, and a second terminal of the second capacitor is electrically connected to the second node;

A gate electrode of the eighth transistor is electrically connected to the reset terminal, a first electrode of the eighth transistor is electrically connected to the reference voltage terminal, and a second electrode of the eighth transistor is electrically connected to the first node;

A gate electrode of the eleventh transistor is electrically connected to the first scanning terminal, a first electrode of the eleventh transistor is electrically connected to the second node, and a second electrode of the eleventh transistor is electrically connected to the data line;

A gate electrode of the seventh transistor is electrically connected to the reset terminal, a first electrode of the seventh transistor is electrically connected to the initial voltage terminal, and a second electrode of the seventh transistor is electrically connected to the second terminal of the driving circuit.

Figure 23:
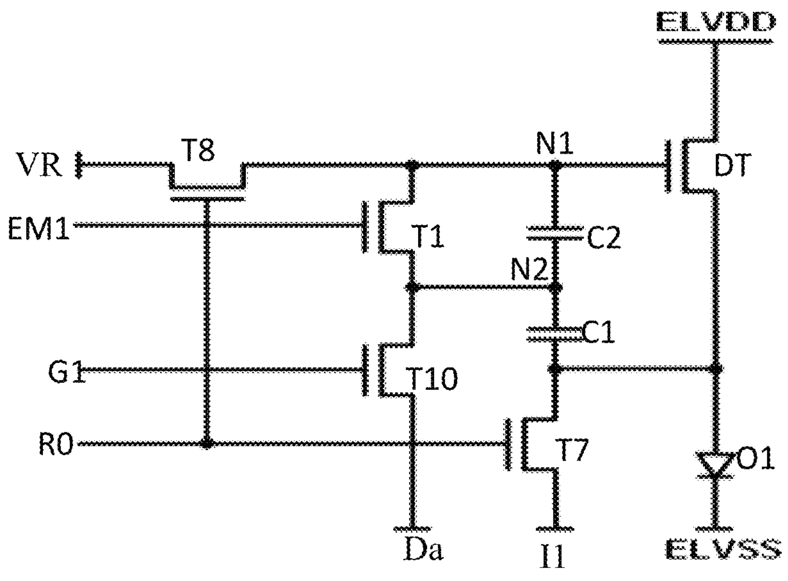
FIG. 23 is a circuit diagram of a pixel circuit according to at least one embodiment of the present disclosure.

As shown in FIG. 23, on the basis of at least one embodiment of the pixel circuit shown in FIG. 22, the first energy storage circuit includes a first capacitor C1, and the second energy storage circuit includes a second capacitor C2, the first control circuit includes a first transistor T1, the first reference voltage writing-in circuit includes an eighth transistor T8, the data writing-in circuit includes an eleventh transistor T11, and the first initialization circuit includes a seventh transistor T7; the driving circuit includes a driving transistor DT; the light emitting element is an organic light emitting diode O1;

The gate electrode of the first transistor T1 is electrically connected to the first light emitting control line EM1, the source electrode of the first transistor T1 is electrically connected to the gate electrode of the driving transistor DT, and the drain electrode of the first transistor T1 is electrically connected to the second Node N2;

The gate electrode of the driving transistor DT is electrically connected to the first node N1, the drain electrode of the driving transistor DT is electrically connected to the power supply voltage terminal ELVDD, the source electrode of the driving transistor DT is electrically connected to the anode of O1; the cathode of O1 is electrically connected to the low voltage terminal ELVSS;

The first terminal of the first capacitor C1 is electrically connected to the second node N2, and the second terminal of the first capacitor C1 is electrically connected to the third node N3;

The first terminal of the second capacitor C2 is electrically connected to the first node N1, and the second terminal of the second capacitor C2 is electrically connected to the second node N2;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the first node N1;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da;

The gate electrode of the seventh transistor T7 is electrically connected to the reset terminal R0, the source electrode of the seventh transistor T7 is electrically connected to the initial voltage terminal I1, and the drain electrode of the seventh transistor T7 is electrically connected to the source electrode of the driving transistor DT.

Figure 24:
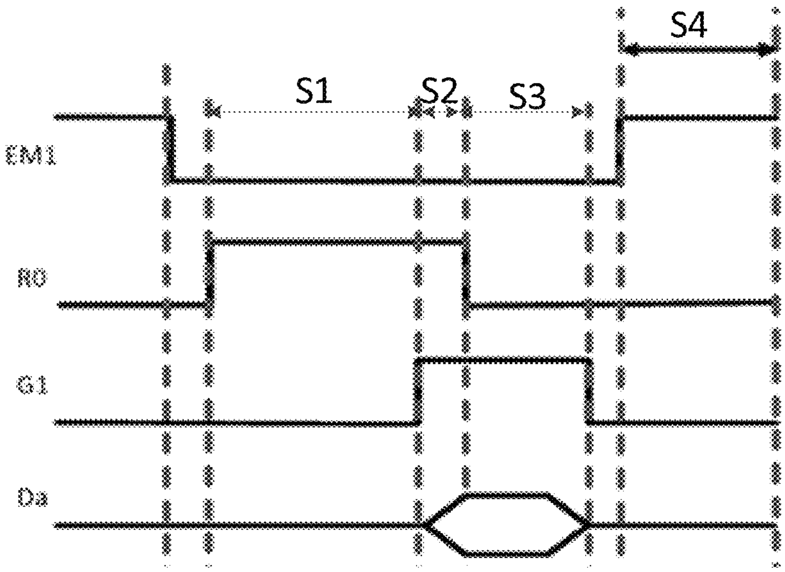
FIG. 24 is a working timing diagram of the pixel circuit shown in FIG. 23.

FIG. 24 is a working timing diagram of the pixel circuit shown in FIG. 23.

As shown in FIG. 24, when at least one embodiment of the pixel circuit shown in FIG. 23 of the present disclosure is working, the display period includes the first phase S1, the second phase S2, the third phase S3 and the fourth phase S4 which are set successively;

In the first phase S1, EM1 and G1 provide a low voltage signal, R0 provides a high voltage signal, T7 and T8 are both turned on to write the reference voltage Vref provided by VR into the first node N1, and write the initial voltage Vint provided by I1 into the source electrode of DT;

In the second phase S2, EM1 provides a low voltage signal, R0 and G1 provide a high voltage signal, Da provides a data voltage Vdata, T7, T8 and T10 are all turned on to write the reference voltage Vref provided by VR into the first node N1, and write the initial voltage Vint provided by I1 into the source electrode of DT, and write the data voltage Vdata into the second node N2;

At the beginning of the second phase S2, DT is turned on, and DT compensates the threshold voltage in a source-follower manner, and the source potential of DT increases continuously from Vint until the source potential of DT becomes Vref−Vth, the threshold voltage compensation is completed at this time, DT is turned off; at this time, the difference between the potential of N2 and the potential of the source electrode of DT is Vdata−(Vref−Vth);

In the third phase S3, EM1 provides a low voltage signal, R0 provides a low voltage signal, G1 provides a high voltage signal, T10 is turned on, and the data line Da provides a data voltage to the second node N2;

In the fourth phase S4, EM1 provides a high voltage signal, R0 and G1 provide a low voltage signal, T1 is turned on to write Vdata into the first node N1, and the gate-source voltage of DT is Vdata−Vref+Vth; the current Ioled passing through O1 is equal to $K(Vdata-Vref)^2$; K is a current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

Figure 25:
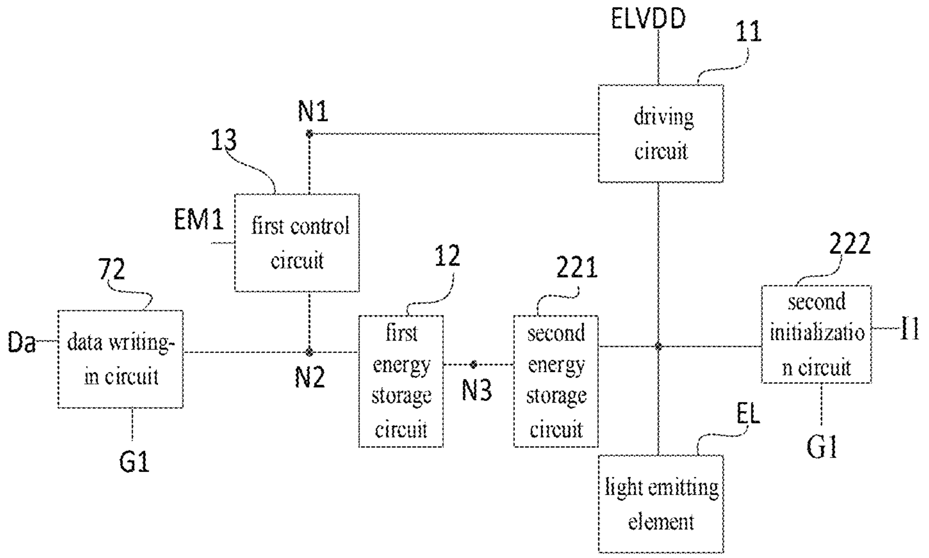
FIG. 25 is a structural diagram of a pixel circuit according to at least one embodiment of the present disclosure.

As shown in FIG. 25, based on the embodiment of the pixel circuit shown in FIG. 1, the pixel circuit described in at least one embodiment of the present disclosure further includes a second energy storage circuit 221 and a second initialization circuit 222;

The second terminal of the first energy storage circuit 12 is electrically connected to the second terminal of the driving circuit 11 through the second energy storage circuit 221;

The first terminal of the second energy storage circuit 221 is electrically connected to the third node N3, and the second terminal of the second energy storage circuit 221 is electrically connected to the second terminal of the driving circuit 11;

The second initialization circuit 222 is electrically connected to the first scanning terminal G1 and the second terminal of the driving circuit 11 respectively, and the second initialization circuit 222 is also electrically connected to the initial voltage terminal I1, is configured to write the initial voltage Vint provided by the initial voltage terminal I1 into the second terminal of the driving circuit 11 under the control of the first scanning signal provided by the first scanning terminal G1.

The pixel circuit described in the embodiment of the present disclosure includes a light emitting element, a driving circuit, an energy storage unit, a first control circuit, a data writing-in circuit and a second initialization circuit;

A control terminal of the driving circuit is electrically connected to the first node, a first terminal of the driving circuit is electrically connected to the power supply voltage terminal, and a second terminal of the driving circuit is electrically connected to the light emitting element; the driving circuit is configured to drive the light emitting element under the control of the potential of the control terminal of the driving circuit;

A control terminal of the first control circuit is electrically connected to the first light emitting control line, a first terminal of the first control circuit is electrically connected to the first node, and a second terminal of the first control circuit is electrically connected to the second node; the first control circuit is configured to control to connect the first node and the second node under the control of the first light emitting control signal provided by the first light emitting control line;

The data writing-in circuit is electrically connected to the first scanning terminal, the second node and the data line respectively, and is configured to write the data voltage provided by the data line into the second node under the control of the first scanning signal provided by the first scanning terminal;

The second initialization circuit is electrically connected to the scanning terminal, the second terminal of the driving circuit, and the second reset voltage terminal, and is configured to control to connect the second terminal of the driving circuit and the second reset voltage terminal under the control of the scanning signal provided by the scanning terminal;

The energy storage unit includes a first energy storage circuit, a second energy storage circuit and a second writing-in circuit;

The first terminal of the first energy storage circuit is electrically connected to the second node, the second terminal of the first energy storage circuit is electrically connected to the third node, and the first energy storage circuit is configured to store electric energy;

The first terminal of the second energy storage circuit is electrically connected to the third node, the second terminal of the second energy storage circuit is electrically connected to the second terminal of the driving circuit, and the second energy storage circuit is configured to store electrical energy;

The second writing-in circuit is electrically connected to the reset terminal and the third node respectively, and is configured to control the potential of the third node under the control of the reset signal provided by the reset terminal.

Optionally, the second reset voltage terminal includes an initial voltage terminal, a first voltage terminal or a third node;

The scanning terminal includes a first scanning terminal or a second scanning terminal.

In specific implementation, the pixel circuit described in the embodiments of the present disclosure may include a light emitting element, a driving circuit, an energy storage unit, a first control circuit, a data writing-in circuit and a second initialization circuit; the first control circuit is configured to control to connect the first node and the second node under the control of the first light emitting control signal; the data writing-in circuit writes the data voltage provided by the data line into the second node under the control of the first scanning signal; the second initialization circuit controls to connect the second terminal of the driving circuit and the second reset voltage terminal under the control of the scanning signal; the second writing-in circuit is configured to control the potential of the third node under the control of the reset signal; the driving circuit is configured to drive the light emitting element under the control of the potential of the control terminal of the driving circuit.

Figure 26:
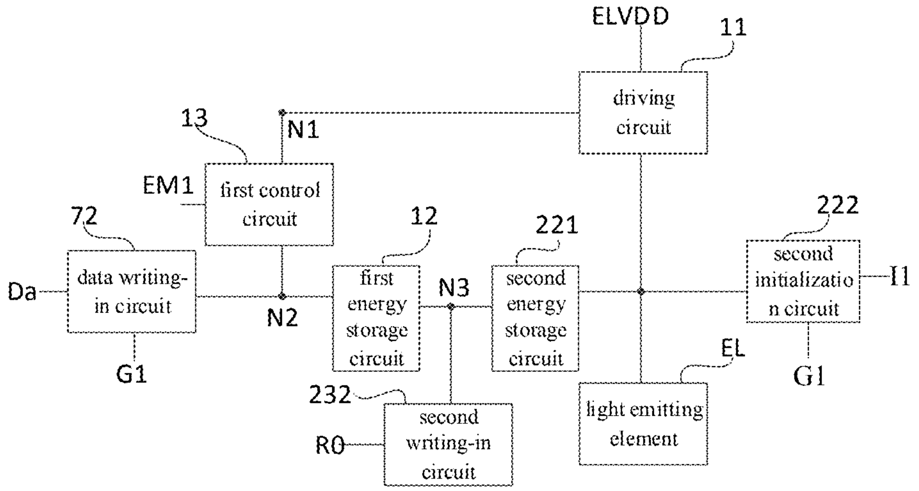
FIG. 26 is a structural diagram of a pixel circuit according to at least one embodiment of the present disclosure.

As shown in FIG. 26, the pixel circuit described in the embodiment of the present disclosure includes a light emitting element EL, a driving circuit 11, an energy storage unit, a first control circuit 13, a data writing-in circuit 72 and a second initialization circuit 222;

A control terminal of the driving circuit 11 is electrically connected to the first node N1, a first terminal of the driving circuit 11 is electrically connected to the power supply voltage terminal ELVDD, and a second terminal of the driving circuit 11 is electrically connected to the light emitting element EL; the driving circuit 11 is configured to drive the light emitting element EL under the control of the potential of the control terminal of the driving circuit;

A control terminal of the first control circuit 13 is electrically connected to the first light emitting control line EM1, a first terminal of the first control circuit 13 is electrically connected to the first node N1, and a second terminal of the first control circuit 13 is electrically connected to the second node N2; the first control circuit 13 is configured to control to connect the first node N1 and the second node N2 under the control of the first light emitting control signal provided by the first light emitting control line EM1;

The data writing-in circuit 72 is electrically connected to the first scanning terminal G1, the second node N2 and the data line Da respectively, and is configured to write the data voltage Vdata provided by the data line Da into the second node N2 under the control of the first scanning signal provided by the first scanning terminal G1;

The second initialization circuit 222 is electrically connected to the first scanning terminal G1, the second terminal of the driving circuit 11 and the second reset voltage terminal Vf2 respectively, and is configured to control to connect the second terminal of the driving circuit 11 and the second reset voltage terminal Vf2 under the control of the scanning signal provided by the first scanning terminal G1;

The energy storage unit includes a first energy storage circuit 12, a second energy storage circuit 221 and a second writing-in circuit 232;

A first terminal of the first energy storage circuit 12 is electrically connected to the second node N2, a second terminal of the first energy storage circuit 12 is electrically connected to the third node N3, and the first energy storage circuit 12 is configured to store electrical energy;

A first terminal of the second energy storage circuit 221 is electrically connected to the third node N3, a second terminal of the second energy storage circuit 221 is electrically connected to the second terminal of the driving circuit 11, and the second energy storage circuit 221 is configured to store electric energy;

The second writing-in circuit 232 is electrically connected to the reset terminal R0 and the third node N3 respectively, and is configured to control the potential of the third node N3 under the control of the reset signal provided by the reset terminal R0.

The pixel circuit described in at least one embodiment of the present disclosure may further include a first writing-in circuit;

The first writing-in circuit is electrically connected to the reset terminal, a writing-in voltage terminal and a writing-in node respectively, and is configured to write the writing-in voltage provided by the writing-in voltage terminal into the writing-in node under the control of the reset signal provided by the reset terminal; the writing-in node includes a first node or a third node, and the writing-in voltage terminal includes a reference voltage terminal or a power supply voltage terminal.

In a specific implementation, the pixel circuit may further include a first writing-in circuit, and the first writing-in circuit writes the writing-in voltage into the writing-in node under the control of the reset signal.

In at least one embodiment of the present disclosure, the writing-in node may include a first node or a third node, but not limited thereto;

The writing-in voltage terminal may include a reference voltage terminal or a power supply voltage terminal, and the writing-in voltage may be a reference voltage or a power supply voltage, but is not limited thereto; in actual operation, the writing-in voltage terminal may include other voltage terminals, the writing-in voltage may be other voltage signals according to actual needs.

Figure 27:
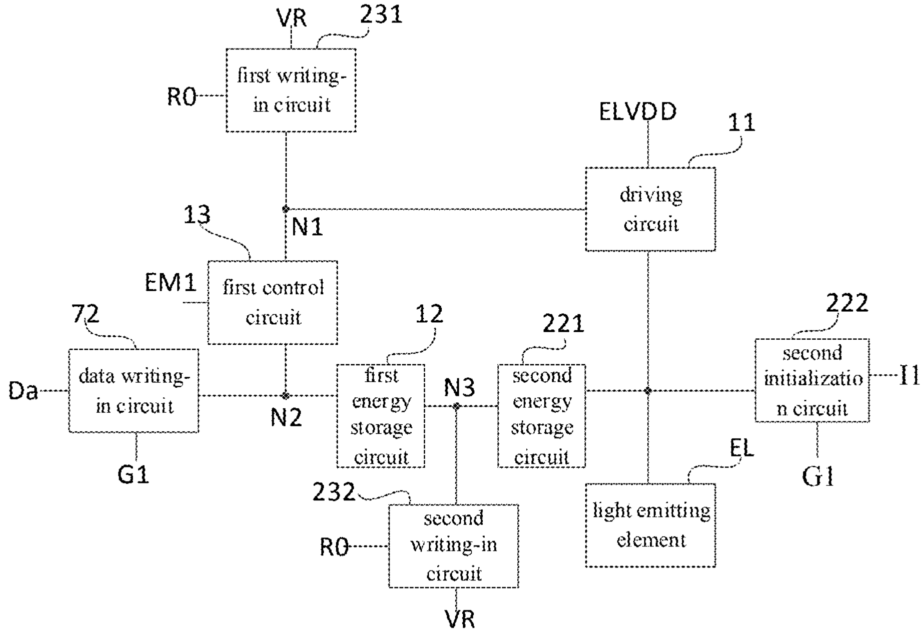
FIG. 27 is a structural diagram of a pixel circuit according to at least one embodiment of the present disclosure.

As shown in FIG. 27, on the basis of at least one embodiment of the pixel circuit shown in FIG. 26, the pixel circuit described in at least one embodiment of the present disclosure may further include a first writing-in circuit 231;

The first writing-in circuit 231 is electrically connected to the reset terminal R0, the reference voltage terminal VR and the control terminal of the driving circuit 11 respectively, and is configured to write the reference voltage Vref provided by the reference voltage terminal VR into the control terminal of the driving circuit 11 under the control of the reset signal provided by the reset terminal R0; the second writing-in circuit 232 is electrically connected to the reset terminal R0 and the third node N3 respectively, and the second writing-in circuit 232 is also electrically connected to the reference voltage terminal VR, is configured to write the reference voltage Vref provided by the reference voltage terminal VR into the third node under the control of the reset signal provided by the reset terminal R0.

In at least one embodiment of the present disclosure, the second writing-in circuit may also be electrically connected to the first reset voltage terminal, and is configured to write the first reset voltage provided by the first reset voltage terminal into the third node under the control of the reset signal provided by the reset terminal;

The first reset voltage terminal includes an initial voltage terminal, a first voltage terminal, a reference voltage terminal or a power supply voltage terminal.

In at least one embodiment of the present disclosure, the first reset voltage terminal may include an initial voltage terminal, a first voltage terminal, a reference voltage terminal or a power supply voltage terminal, and the first reset voltage may be an initial voltage, a first voltage, a reference voltage or a power supply voltage, but not limited thereto, in actual operation, the first reset voltage terminal may include other voltage terminals, and the reset voltage may be other voltage signals according to actual needs.

During specific implementation, the second writing-in circuit may write the first reset voltage into the third node under the control of the reset signal.

In at least one embodiment of the present disclosure, the second writing-in circuit may also be electrically connected to the control terminal of the driving circuit, and is configured to control to connect the control terminal of the driving circuit and the third node under the control of the reset signal.

In a specific implementation, the second writing-in circuit may control to connect the control terminal of the driving circuit and the third node under the control of the reset signal.

Figure 28:
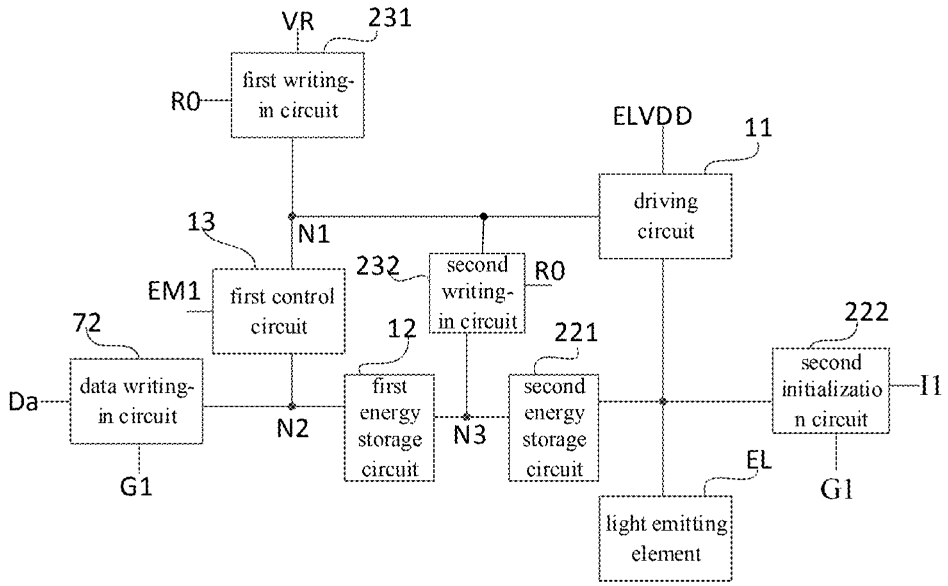
FIG. 28 is a structural diagram of a pixel circuit according to at least one embodiment of the present disclosure.

As shown in FIG. 28, on the basis of at least one embodiment of the pixel circuit shown in FIG. 26, the pixel circuit described in at least one embodiment of the present disclosure may further include a first writing-in circuit 231;

The first writing-in circuit 231 is electrically connected to the reset terminal R0, the reference voltage terminal VR and the control terminal of the driving circuit 11 respectively, and is configured to write the reference voltage Vref provided by the reference voltage terminal VR into the control terminal of the driving circuit 11 under the control of the reset signal provided by the reset terminal R0;

The second writing-in circuit 232 is electrically connected to the reset terminal R0, the control terminal of the driving circuit 11 and the third node N3 respectively, and is configured to control to connect the control terminal of the driving circuit 11 and the third node N3 under the control of the reset signal.

Figure 29:
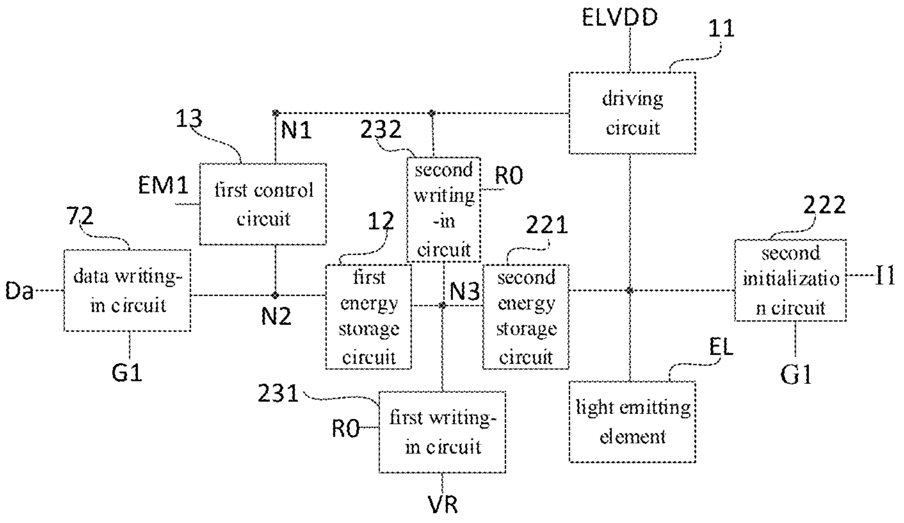
FIG. 29 is a structural diagram of a pixel circuit according to at least one embodiment of the present disclosure.

As shown in FIG. 29, on the basis of at least one embodiment of the pixel circuit shown in FIG. 26, the pixel circuit described in at least one embodiment of the present disclosure may further include a first writing-in circuit 231;

The first writing-in circuit 231 is electrically connected to the reset terminal R0, the reference voltage terminal VR and the third node N3 respectively, and is configured to write the reference voltage provided by the reference voltage terminal VR into the third node N3 under the control of the reset signal provided by the reset terminal R0;

The second writing-in circuit 232 is electrically connected to the reset terminal R0, the third node N3 and the control terminal of the driving circuit 11, and is configured to control to connect the third node and the control terminal of the driving circuit 11 under the control of the reset signal.

The pixel circuit described in at least one embodiment of the present disclosure may further include a first light emitting control circuit;

The first light emitting control circuit is electrically connected to the second light emitting control line, the power supply voltage terminal and the first terminal of the driving circuit respectively, is configured to control to connect the power supply voltage terminal and the first terminal of the driving circuit under the control of the second light emitting control signal provided by the second light emitting control line.

Figure 30:
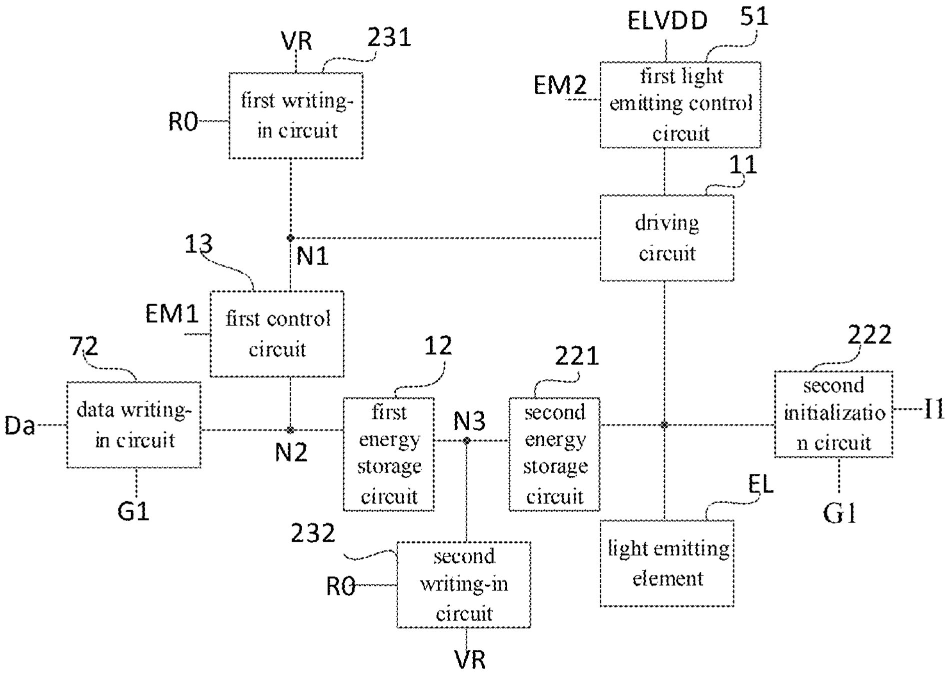
FIG. 30 is a structural diagram of a pixel circuit according to at least one embodiment of the present disclosure.

As shown in FIG. 30, on the basis of at least one embodiment of the pixel circuit shown in FIG. 27, the pixel circuit described in at least one embodiment of the present disclosure may further include a first light emitting control circuit 51;

The first light emitting control circuit 51 is electrically connected to the second light emitting control line EM2, the power supply voltage terminal ELVDD, and the first terminal of the driving circuit 11, respectively, is configured to control to connect the power supply voltage terminal ELVDD and the first terminal of the driving circuit 11 under the control of the second light emitting control signal provided by the second light emitting control line EM2.

Figure 31:
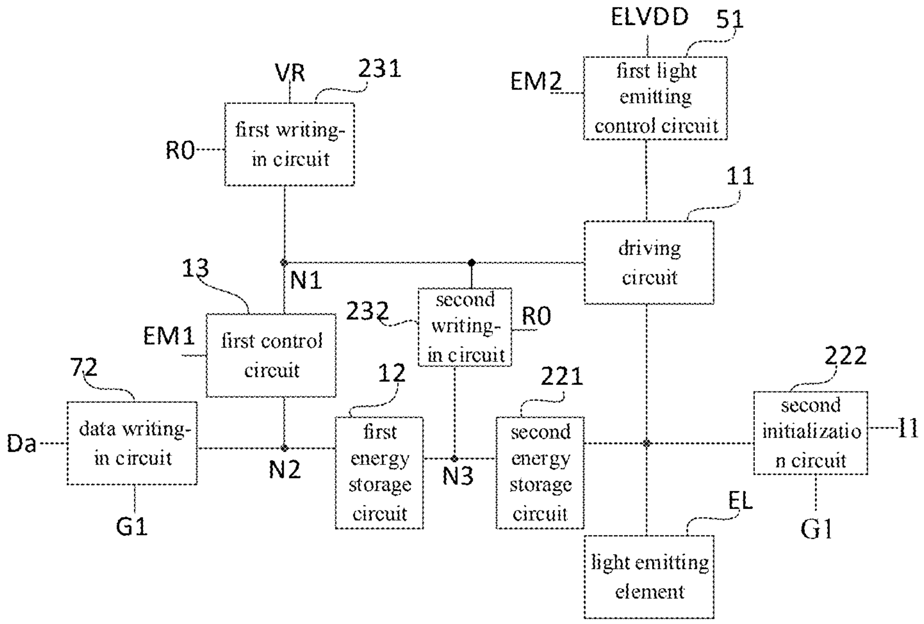
FIG. 31 is a structural diagram of a pixel circuit according to at least one embodiment of the present disclosure.

As shown in FIG. 31, on the basis of at least one embodiment of the pixel circuit shown in FIG. 28, the pixel circuit described in at least one embodiment of the present disclosure may further include a first light emitting control circuit 51;

The first light emitting control circuit 51 is electrically connected to the second light emitting control line EM2, the power supply voltage terminal ELVDD and the first terminal of the driving circuit 11 respectively, and is configured to control to connect the power supply voltage terminal ELVDD and the first terminal of the driving circuit 11 under the control of the second light emitting control signal provided by the second light emitting control line EM.

Figure 32:
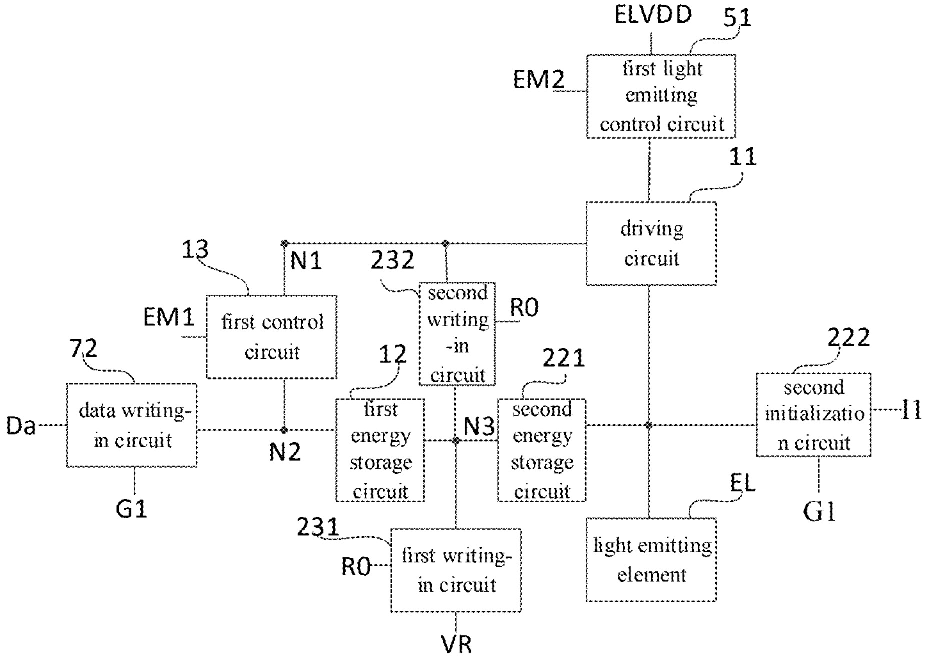
FIG. 32 is a structural diagram of a pixel circuit according to at least one embodiment of the present disclosure.

As shown in FIG. 32, on the basis of at least one embodiment of the pixel circuit shown in FIG. 29, the pixel circuit described in at least one embodiment of the present disclosure may further include a first light emitting control circuit 51;

The first light emitting control circuit 51 is electrically connected to the second light emitting control line EM2, the power supply voltage terminal ELVDD and the first terminal of the driving circuit 11 respectively, and is configured to control to connect the power supply voltage terminal ELVDD and the first terminal of the driving circuit 11 under the control of the second light emitting control signal provided by the second light emitting control line EM.

Figure 33:
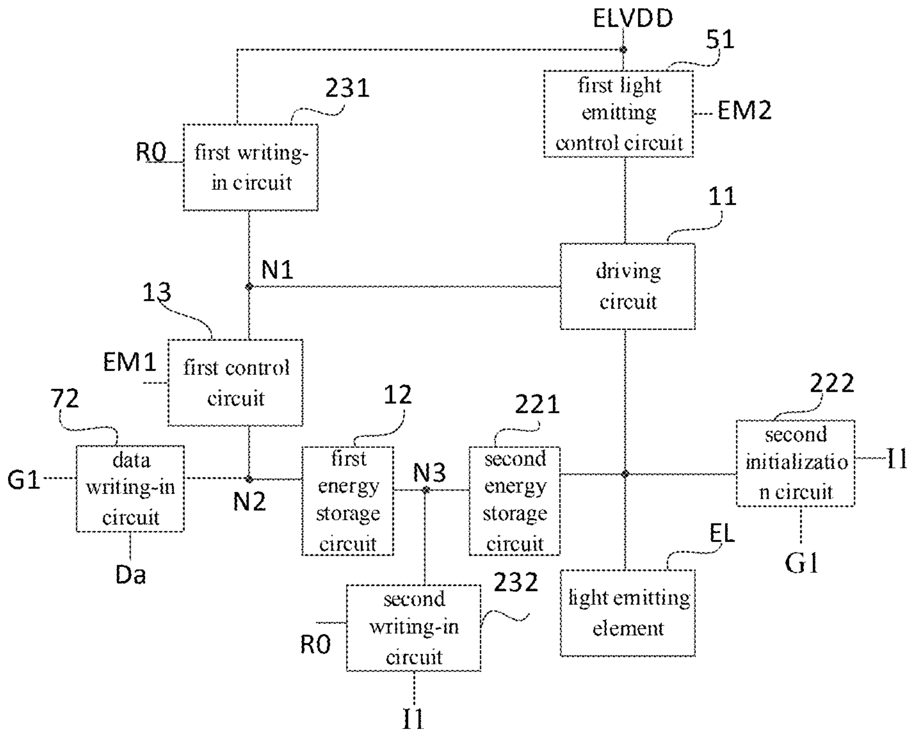
FIG. 33 is a structural diagram of a pixel circuit according to at least one embodiment of the present disclosure.

As shown in FIG. 33, on the basis of at least one embodiment of the pixel circuit shown in FIG. 26, the pixel circuit described in at least one embodiment of the present disclosure may further include a first writing-in circuit 231 and a first light emitting control circuit 51;

The first writing-in circuit 231 is electrically connected to the reset terminal R0, the power supply voltage terminal ELVDD and the control terminal of the driving circuit 11, and is configured to control to connect the power supply voltage terminal ELVDD and the control terminals of the driving circuit 11 under the control of the reset signal provided by the reset terminal R0;

The second writing-in circuit 232 is electrically connected to the reset terminal R0, the third node N3 and the initial voltage terminal I1 respectively, and is configured to control the initial voltage terminal I1 to write an initial voltage Vint into the third node N3 under the control of the reset signal;

The first light emitting control circuit 51 is electrically connected to the second light emitting control line EM2, the power supply voltage terminal ELVDD, and the first terminal of the driving circuit 11, respectively, is configured to control to connect the power supply voltage terminal ELVDD and the first terminal of the driving circuit 11 under the control of the second light emitting control signal provided by the second light emitting control line EM2.

Optionally, the first energy storage circuit includes a first capacitor; the second energy storage circuit includes a second capacitor, and the second initialization circuit includes a seventh transistor;

A gate electrode of the seventh transistor is electrically connected to a first scanning terminal or a second scanning terminal, a first electrode of the seventh transistor is electrically connected to a second reset voltage terminal, and a second electrode of the seventh transistor electrically connected to the second terminal of the driving circuit;

A first terminal of the first capacitor is electrically connected to the second node, and a second terminal of the first capacitor is electrically connected to the third node;

A first terminal of the second capacitor is electrically connected to the third node, and a second terminal of the second capacitor is electrically connected to the second terminal of the driving circuit.

Optionally, the first writing-in circuit includes an eighth transistor;

A gate electrode of the eighth transistor is electrically connected to the reset terminal, a first electrode of the eighth transistor is electrically connected to the reference voltage terminal, and a second electrode of the eighth transistor is electrically connected to the control terminal of the driving circuit.

Optionally, the second writing-in circuit includes a ninth transistor;

A gate electrode of the ninth transistor is electrically connected to the reset terminal, a first electrode of the ninth transistor is electrically connected to the first reset voltage terminal, and a second electrode of the ninth transistor is electrically connected to the third node.

Optionally, the second writing-in circuit includes a ninth transistor;

A gate electrode of the ninth transistor is electrically connected to the reset terminal, a first electrode of the ninth transistor is electrically connected to the third node, and a second electrode of the ninth transistor is connected to the control circuit of the driving circuit.

Optionally, the first light emitting control circuit includes a fourth transistor;

A gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit.

Optionally, the data writing-in circuit includes a tenth transistor;

A gate electrode of the tenth transistor is electrically connected to the first scanning terminal, a first electrode of the tenth transistor is electrically connected to the second node, and a second electrode of the tenth transistor is electrically connected to the data line.

Figure 34:
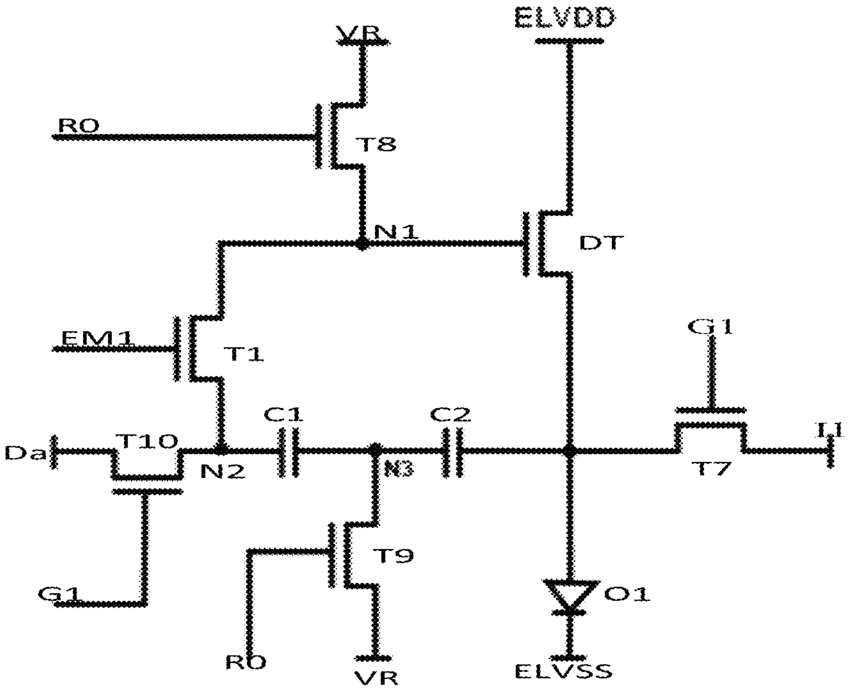
FIG. 34 is a circuit diagram of a pixel circuit according to at least one embodiment of the present disclosure.

As shown in FIG. 34, on the basis of at least one embodiment of the pixel circuit shown in FIG. 27, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2, and the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the gate electrode of the driving transistor DT;

The gate electrode of the ninth transistor T9 is electrically connected to the reset terminal R0, and the drain electrode of the ninth transistor T9 is electrically connected to the third node N3;

The source electrode of the ninth transistor T9 is electrically connected to the reference voltage terminal VR;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 34, all transistors are n-type transistors, but not limited thereto.

Figure 35:
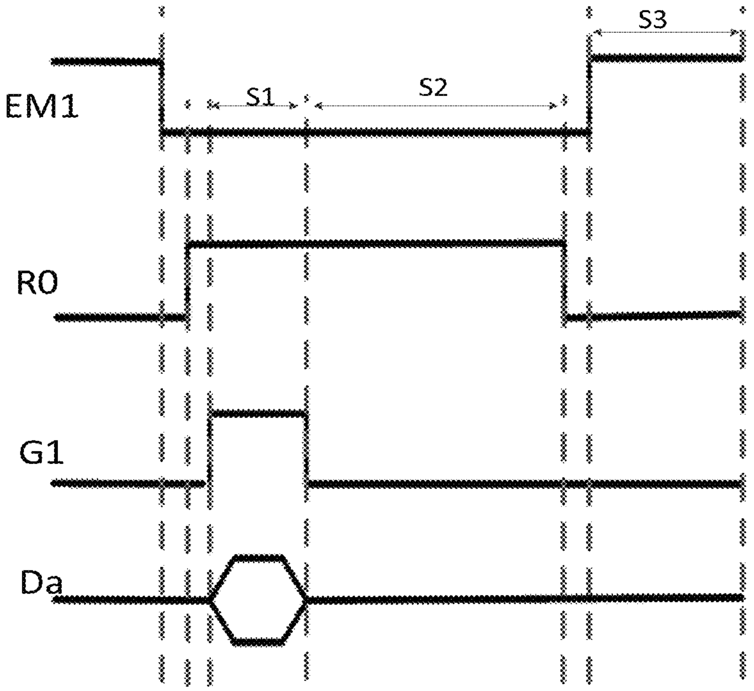
FIG. 35 is a working timing diagram of the pixel circuit shown in FIG. 34.

As shown in FIG. 35, when at least one embodiment of the pixel circuit shown in FIG. 34 of the present disclosure is working, the display period may include a first phase S1, a second phase S2, and a third phase S3 that are set successively;

In the first phase S1, EM1 provides a low voltage signal, R0 provides a high voltage signal, G1 provides a high voltage signal, Da provides a data voltage Vdata, T8 is turned on to write the reference voltage Vref provided by VR into the gate electrode of DT, and T1 is turned off, T10 is turned on to write the data voltage Vdata into the second node N2, T9 is turned on to write Vref into the third node N3, and T7 is turned on to write Vint into the source electrode of DT;

In the second phase S2, EM1 provides a low voltage signal, R0 provides a high voltage signal, G1 provides a low voltage signal, T8 is turned on to write Vref into the gate electrode of DT, and T9 is turned on to write Vref into the third node N3;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM provides a high voltage signal, R0 provides a low voltage signal, G1 provides a low voltage signal, T1 is turned on, the gate potential of DT is Vdata, and the gate-source voltage of DT is Vdata−Vref+Vth; at this time, the current Ioled flowing through O1 is equal to $K(Vdata-Vref)^2$; K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

In at least one embodiment of the pixel circuit shown in FIG. 34 of the present disclosure, two capacitors are connected in series, and a stable potential is applied to the third node between the two capacitors to prevent the change of the signal written to the third node, and the reset of the anode potential of O1 and writing the data voltage into the first capacitor are controlled by the same signal, and the data voltage is written into the gate electrode of the driving transistor through the first light emitting control signal to achieve light emitting; the data voltage writing-in time is not controlled by the threshold voltage compensation time, thereby realizing high-speed writing; at least one embodiment of the present disclosure needs to use fewer control signals to achieve exactly the same technical effect.

When at least one embodiment of the pixel circuit shown in FIG. 34 of the present disclosure is working, in the first phase S1, R0 provides a high voltage signal, G1 provides a high voltage signal, and T10 is turned on to write the data voltage Vdata provided by the data line Da into the second node N2, T9 is turned on to write the reference voltage Vref provided by VR into the third node N3, and T7 is turned on to write the initial voltage Vint provided by I1 into the second terminal of C2.

Figure 36:
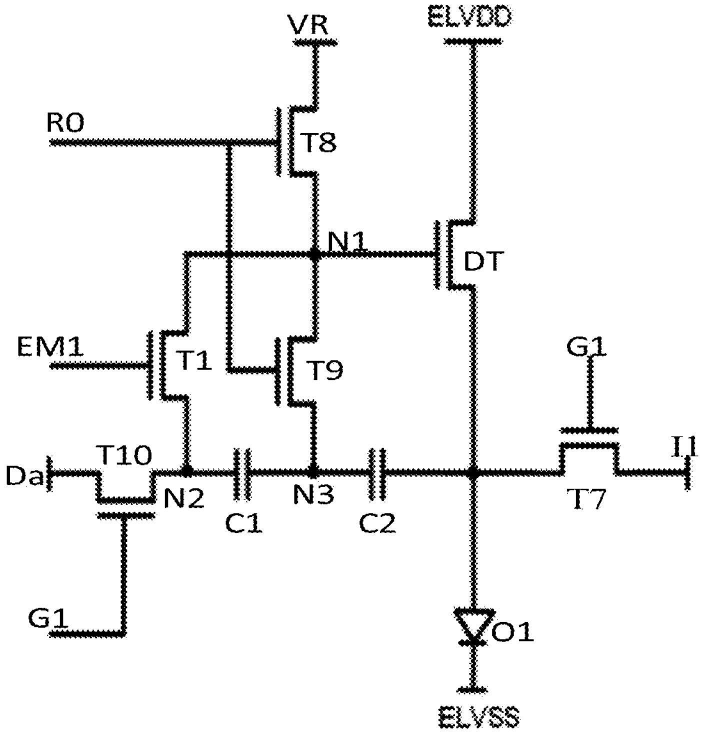
FIG. 36 is a circuit diagram of a pixel circuit according to at least one embodiment of the present disclosure.

As shown in FIG. 36, on the basis of at least one embodiment of the pixel circuit shown in FIG. 28, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2; the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the gate electrode of the driving transistor DT;

The gate electrode of the ninth transistor T9 is electrically connected to the reset terminal R0, the source electrode of the ninth transistor T9 is electrically connected to the third node N3, and the drain electrode of the ninth transistor T9 is electrically connected to the gate electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 36, all transistors are n-type transistors, but not limited thereto.

Figure 37:
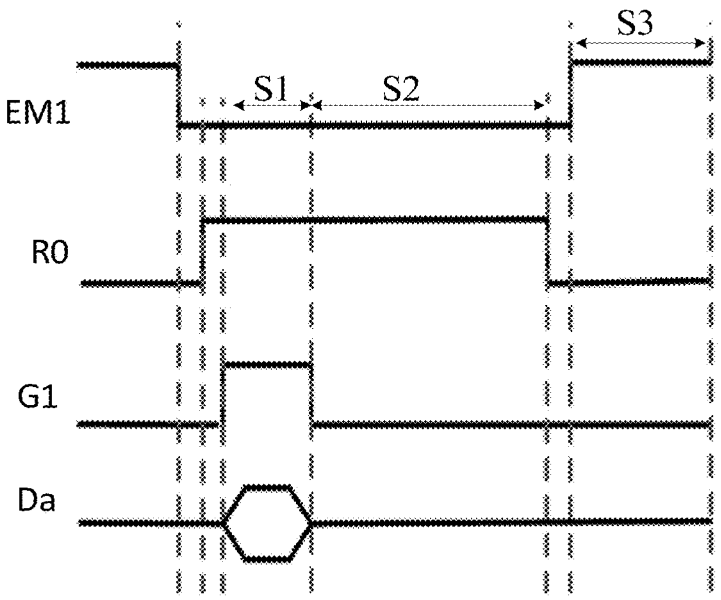
FIG. 37 is a working timing diagram of the pixel circuit shown in FIG. 36.

FIG. 37 is a working timing diagram of the pixel circuit shown in FIG. 36.

As shown in FIG. 37, when at least one embodiment of the pixel circuit shown in FIG. 36 of the present disclosure is working, the display period may include a first phase S1, a second phase S2 and a third phase S3 which are set successively;

In the first phase S1, EM1 provides a low voltage signal, R0 provides a high voltage signal, G1 provides a high voltage signal, Da provides a data voltage Vdata, T8 is turned on to write the reference voltage Vref provided by VR into the gate electrode of DT, and T1 is turned off, T10 is turned on to write the data voltage Vdata into the second node N2, T9 is turned on to control to connect the first node N1 and the third node N3, so that the potential of the third node N3 is Vref; T7 is turned on to write Vint into the source electrode of DT;

In the second phase S2, EM1 provides a low voltage signal, R0 provides a high voltage signal, G1 provides a low voltage signal, T8 is turned on to write Vref into the gate electrode of DT, T9 is turned on to control to connect the first node N1 and the third node N3, so that the potential of the third node N3 is Vref;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM provides a high voltage signal, R0 provides a low voltage signal, G1 provides a low voltage signal, T1 is turned on, the gate potential of DT is Vdata, and the gate-source voltage of DT is Vdata−Vref+Vth; at this time, the current Ioled flowing through O1 is equal to $K(Vdata-Vref)^2$; K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

When at least one embodiment of the pixel circuit shown in FIG. 36 of the present disclosure is working, in the first phase S1, both R0 and G1 provide high voltage signals, and T8 and T9 are both turned on, so as to write the reference voltage Vref provided by VR into the third node N3, T10 and T7 are all turned on, so as to write the data voltage Vdata provided by the data line Da into the second node, and write the initial voltage Vint provided by I1 into the second terminal of C2.

Figure 38:
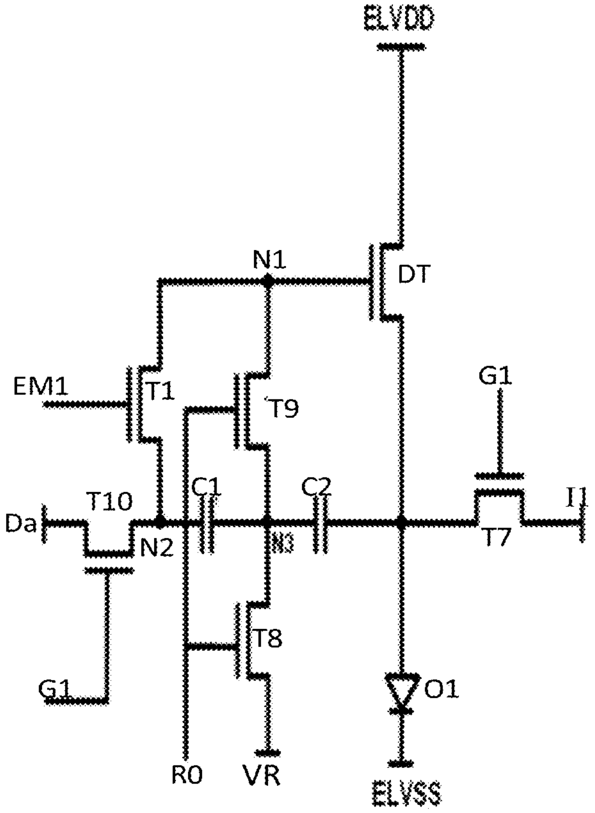
FIG. 38 is a circuit diagram of a pixel circuit according to at least one embodiment of the present disclosure.

As shown in FIG. 38, on the basis of at least one embodiment of the pixel circuit shown in FIG. 29, the driving circuit includes a driving transistor DT, the first control circuit includes a first transistor T1, and the first energy storage circuit includes a first capacitor C1; the light emitting element is an organic light emitting diode O1;

The gate electrode of the first transistor T1 is electrically connected to the first light emitting control line EM1, the source electrode of the first transistor T1 is electrically connected to the power supply voltage terminal ELVDD, and the drain electrode of the first transistor T1 is electrically connected to the first node N1;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2; the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the third node N3;

The gate electrode of the ninth transistor T9 is electrically connected to the reset terminal R0, the source electrode of the ninth transistor T9 is electrically connected to the third node N3, and the drain electrode of the ninth transistor T9 is electrically connected to the gate electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 38, all transistors are n-type transistors, but not limited thereto.

Figure 39:
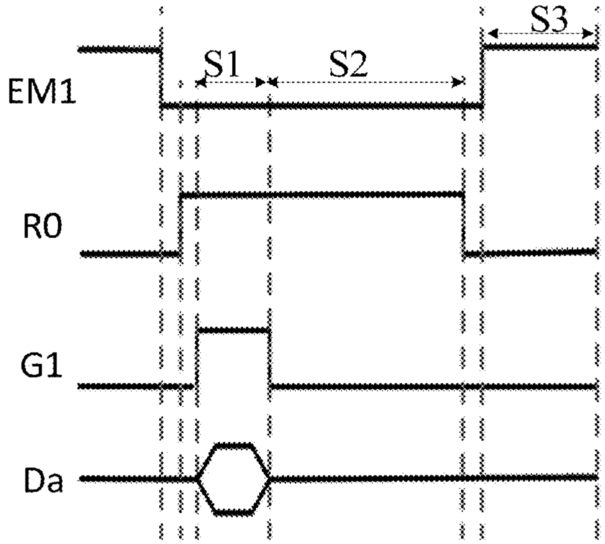
FIG. 39 is a working timing diagram of the pixel circuit shown in FIG. 38.

FIG. 39 is a working timing diagram of the pixel circuit shown in FIG. 38.

As shown in FIG. 39, when at least one embodiment of the pixel circuit shown in FIG. 38 of the present disclosure is working, the display period may include a first phase S1, a second phase S2, and a third phase S3 that are set successively;

In the first phase S1, EM1 provides a low voltage signal, R0 provides a high voltage signal, G1 provides a high voltage signal, Da provides a data voltage Vdata, T8 is turned on to write the reference voltage Vref provided by VR into the third node N3, and T1 is turned off, T10 is turned on to write the data voltage Vdata into the second node N2, T9 is turned on to control to connect the first node N1 and the third node N3, so that the potential of the first node N1 is Vref; T7 is turned on to write Vint into the source electrode of DT;

In the second phase S2, EM1 provides a low voltage signal, R0 provides a high voltage signal, G1 provides a low voltage signal, T8 is turned on to write Vref into the third node N3, T9 is turned on to control to connect the first node N1 and the third node N3, so that the potential of the first node N1 is Vref;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM provides a high voltage signal, R0 provides a low voltage signal, G1 provides a low voltage signal, T1 is turned on, the gate potential of DT is Vdata, and the gate-source voltage of DT is Vdata−Vref+Vth; at this time, the current Ioled flowing through O1 is equal to $K(Vdata-Vref)^2$; K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

When at least one embodiment of the pixel circuit shown in FIG. 38 of the present disclosure is working, in the first phase S1, both R0 and G1 provide high voltage signals, and T8 and T9 are both turned on, so as to write the reference voltage Vref provided by VR into the third node N3, T10 and T7 are all turned on, so as to write the data voltage Vdata provided by the data line Da into the second node, and write the initial voltage Vint provided by I1 into the second terminal of C2.

Figure 40:
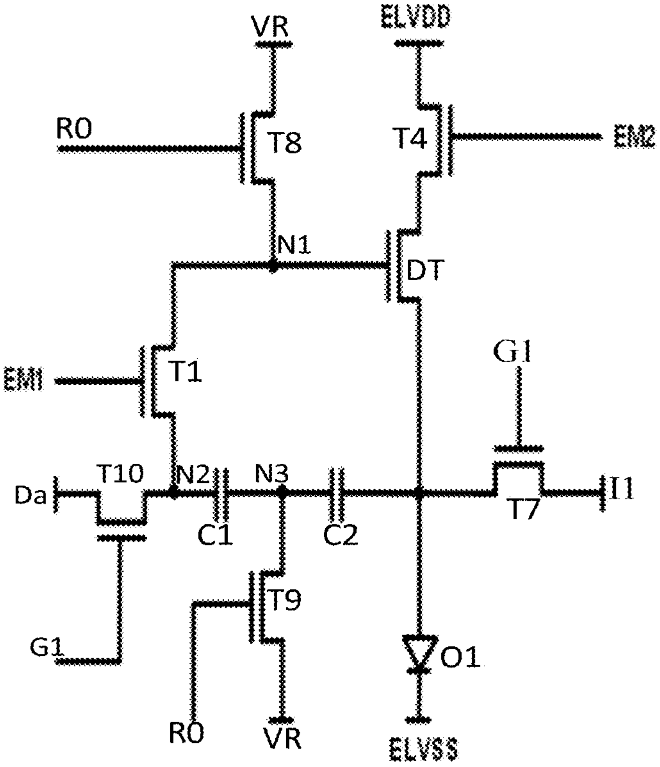
FIG. 40 is a circuit diagram of a pixel circuit according to at least one embodiment of the present disclosure.

As shown in FIG. 40, on the basis of at least one embodiment of the pixel circuit shown in FIG. 30, the driving circuit includes a driving transistor DT, the first control circuit includes a first transistor T1, and the first energy storage circuit includes a first capacitor C1; the light emitting element is an organic light emitting diode O1; the first light emitting control circuit includes a fourth transistor T4;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2, and the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the gate electrode of the driving transistor DT;

The gate electrode of the ninth transistor T9 is electrically connected to the reset terminal R0, and the drain electrode of the ninth transistor T9 is electrically connected to the third node N3;

The source electrode of the ninth transistor T9 is electrically connected to the reference voltage terminal VR;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 40, all transistors are n-type transistors, but not limited thereto.

Figure 41:
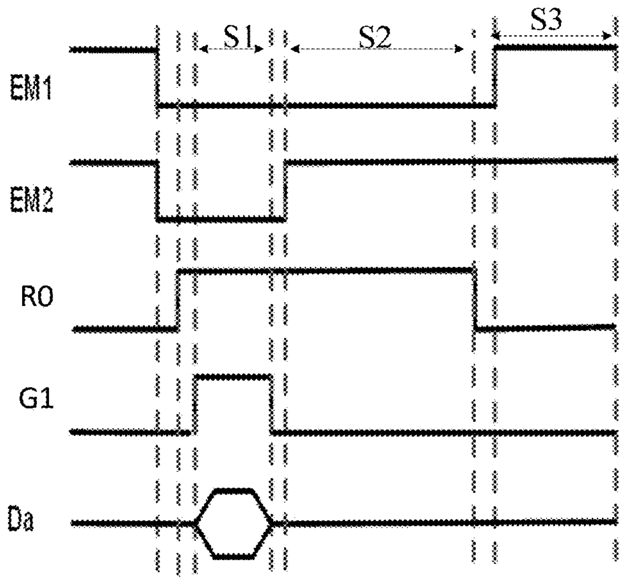
FIG. 41 is a working timing diagram of the pixel circuit shown in FIG. 40.

FIG. 41 is a working timing diagram of the pixel circuit shown in FIG. 40.

As shown in FIG. 41, when at least one embodiment of the pixel circuit shown in FIG. 40 of the present disclosure is working, the display period may include a first phase S1, a second phase S2 and a third phase S3 which are set successively;

In the first phase S1, EM1 provides a low voltage signal, EM2 provides a low voltage signal, R0 provides a high voltage signal, G1 provides a high voltage signal, Da provides the data voltage Vdata, T4 is turned off, and T8 is turned on to write the reference voltage Vref provided by VR into the gate electrode of DT, T1 is turned off, T10 is turned on to write the data voltage Vdata into the second node N2, T9 is turned on to write Vref into the third node N3, T7 is turned on to write Vint into the source electrode of DT;

In the second phase S2, EM1 provides a low voltage signal, EM2 provides a high voltage signal, R0 provides a high voltage signal, G1 provides a low voltage signal, T8 is turned on to write Vref to the gate electrode of DT, T9 is turned on to write Vref to into the third node N3; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM1 provides a high voltage signal, EM2 provides a high voltage signal, R0 provides a low voltage signal, G1 provides a low voltage signal, T1 and T4 are turned on, and the drain electrode of DT is electrically connected to ELVDD;

The gate potential of DT is Vdata, and the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

When at least one embodiment of the pixel circuit shown in FIG. 40 of the present disclosure is working, in the first phase S1, both R0 and G1 provide high voltage signals, and T9 is turned on to write the reference voltage Vref provided by VR into the third node N3, both T10 and T7 are turned on, so as to write the data voltage Vdata provided by the data line Da into the second node, and write the initial voltage Vint provided by I1 into the second terminal of C2.

Figure 42:
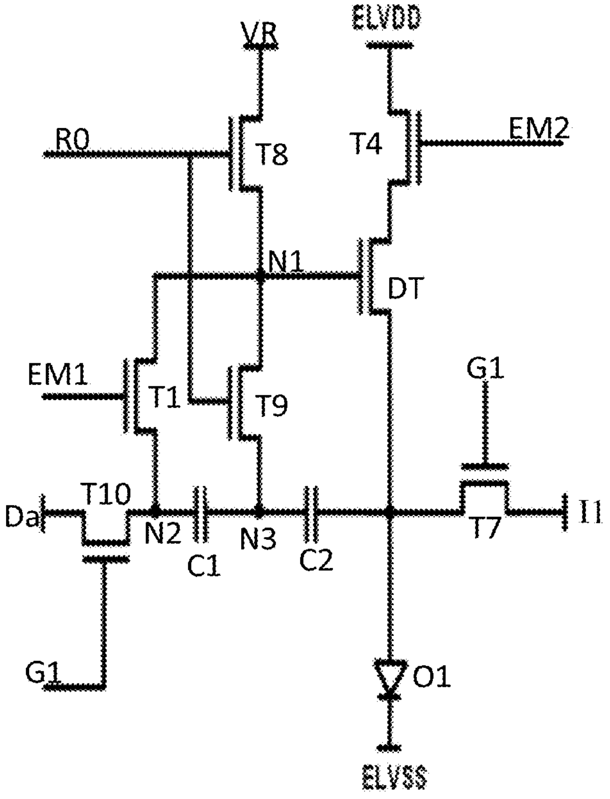
FIG. 42 is a circuit diagram of a pixel circuit according to at least one embodiment of the present disclosure.

As shown in FIG. 42, on the basis of at least one embodiment of the pixel circuit shown in FIG. 31, the driving circuit includes a driving transistor DT, the first control circuit includes a first transistor T1, and the first energy storage circuit includes a first capacitor C1; the light emitting element is an organic light emitting diode O1; the first light emitting control circuit includes a fourth transistor T4;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2; the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the gate electrode of the driving transistor DT;

The gate electrode of the ninth transistor T9 is electrically connected to the reset terminal R0, the source electrode of the ninth transistor T9 is electrically connected to the third node N3, and the drain electrode of the ninth transistor T9 is electrically connected to the gate electrode of the driving transistor DT; The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 42, all transistors are n-type transistors, but not limited thereto.

Figure 43:
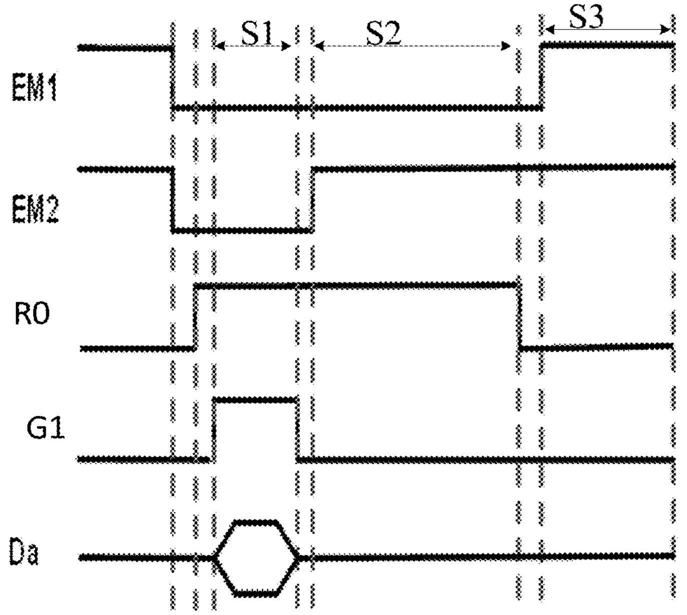
FIG. 43 is a working timing diagram of the pixel circuit shown in FIG. 42.

FIG. 43 is a working timing diagram of the pixel circuit shown in FIG. 42.

As shown in FIG. 43, when at least one embodiment of the pixel circuit shown in FIG. 42 of the present disclosure is working, the display period may include a first phase S1, a second phase S2, and a third phase S3 that are set successively;

In the first phase S1, EM1 provides a low voltage signal, EM2 provides a low voltage signal, R0 provides a high voltage signal, G1 provides a high voltage signal, Da provides the data voltage Vdata, T8 is turned on to write the reference voltage Vref provided by VR into the gate electrode of DT, T1 and T4 are turned off, T10 is turned on to write the data voltage Vdata into the second node N2, T9 is turned on to control to connect the first node N1 and the third node N3, so that the potential of the third node N3 is Vref; T7 is turned on to write Vint to the source electrode of DT;

In the second phase S2, EM1 provides a low voltage signal, EM2 provides a high voltage signal, R0 provides a high voltage signal, G1 provides a low voltage signal, T4 is turned on, the drain electrode of DT is electrically connected to ELVDD, and T8 is turned on to write Vref into the gate electrode of DT, T9 is turned on, so as to control to connect the first node N1 and the third node N3, so that the potential of the third node N3 is Vref;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM1 and EM2 provide high voltage signals, R0 provides low voltage signals, G1 provides low voltage signals, T1 and T4 are turned on, the drain electrode of DT is electrically connected to ELVDD, and the gate potential of DT is Vdata, the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

Figure 44:
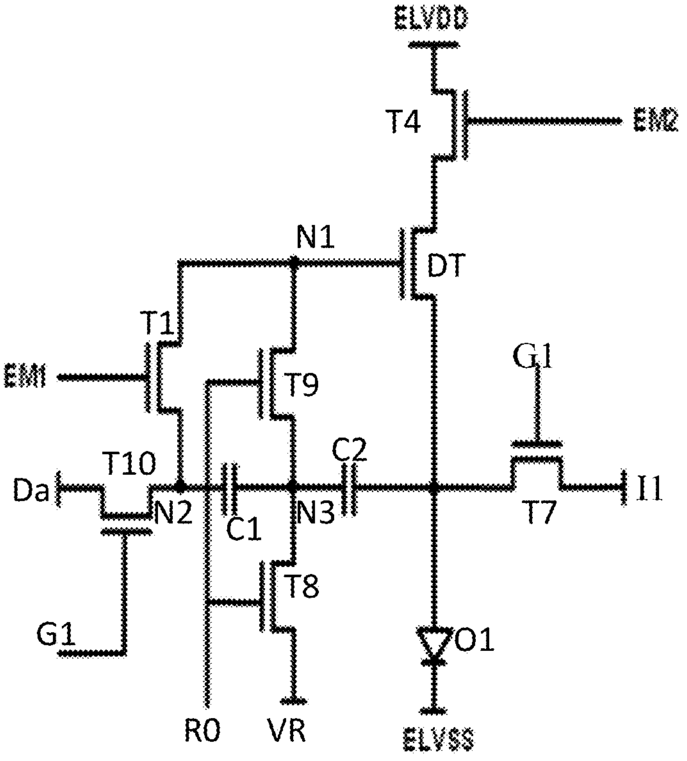
FIG. 44 is a circuit diagram of a pixel circuit according to at least one embodiment of the present disclosure.

As shown in FIG. 44, on the basis of at least one embodiment of the pixel circuit shown in FIG. 32, the driving circuit includes a driving transistor DT, the first control circuit includes a first transistor T1, and the first energy storage circuit includes a first capacitor C1; the light emitting element is an organic light emitting diode O1; the first light emitting control circuit includes a fourth transistor T4;

The gate electrode of the first transistor T1 is electrically connected to the first light emitting control line EM1, the source electrode of the first transistor T1 is electrically connected to the first node N1, and the drain electrode of the first transistor T1 is electrically connected to the second node N2;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2; the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the reference voltage terminal VR, and the drain electrode of the eighth transistor T8 is electrically connected to the third node N3;

The gate electrode of the ninth transistor T9 is electrically connected to the reset terminal R0, the source electrode of the ninth transistor T9 is electrically connected to the third node N3, and the drain electrode of the ninth transistor T9 is electrically connected to the gate electrode of the driving transistor DT;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 44, all transistors are n-type transistors, but not limited thereto.

Figure 45:
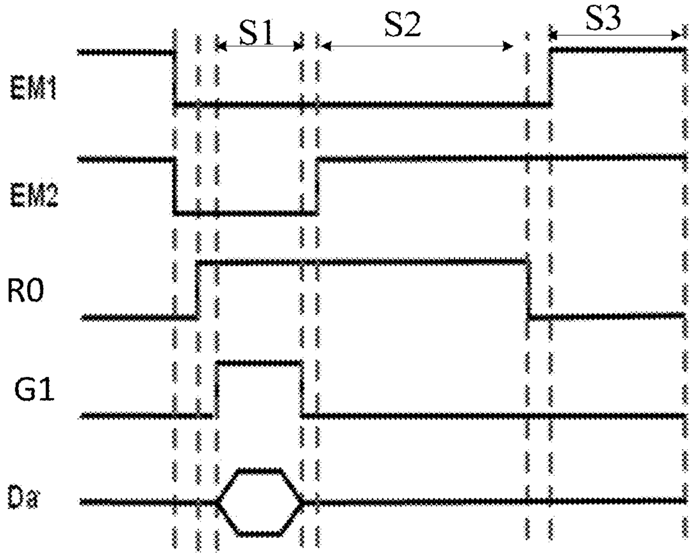
FIG. 45 is a working timing diagram of the pixel circuit shown in FIG. 44.

FIG. 45 is a working timing diagram of the pixel circuit shown in FIG. 44.

As shown in FIG. 45, when at least one embodiment of the pixel circuit shown in FIG. 44 of the present disclosure is working, the display period may include the first phase S1, the second phase S2 and the third phase S3 which are set successively;

In the first phase S1, EM1 and EM2 provide low voltage signals, R0 provides a high voltage signal, G1 provides a high voltage signal, Da provides data voltage Vdata, T8 is turned on to write the reference voltage Vref provided by VR into the third node N3, T1 and T4 are turned off, T10 is turned on to write the data voltage Vdata into the second node N2, T9 is turned on to control to connect the first node N1 and the third node N3, so that the potential of the first node N1 is Vref; T7 is turned on to write Vint to the source electrode of DT;

In the second phase S2, EM1 provides a low voltage signal, EM2 provides a high voltage signal, R0 provides a high voltage signal, G1 provides a low voltage signal, T8 is turned on to write Vref into the third node N3, T9 is turned on to control to connect the first node N1 and the third node N3, so that the potential of the first node N1 is Vref; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM1 and EM2 provide high voltage signals, R0 provides low voltage signals, G1 provides low voltage signals, T1 and T4 are turned on, the drain electrode of DT is electrically connected to ELVDD, and the gate potential of DT is Vdata, the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

Figure 46:
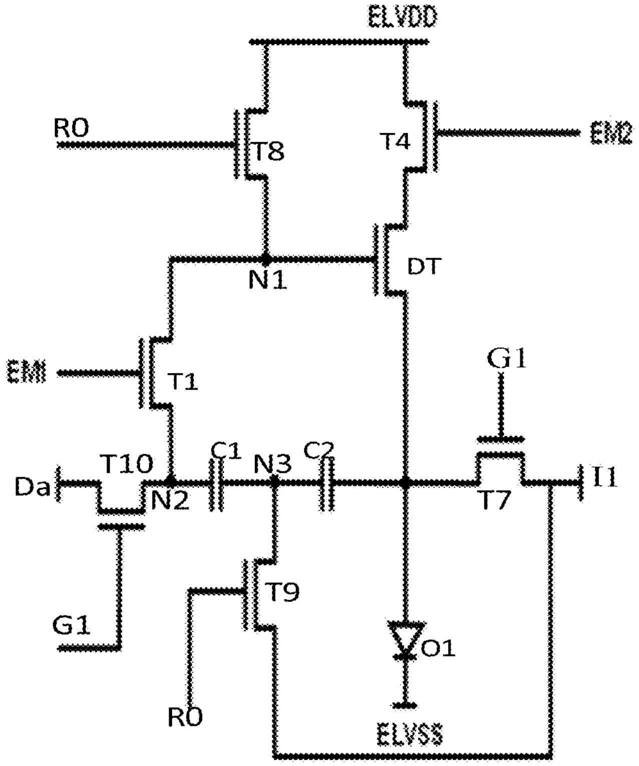
FIG. 46 is a circuit diagram of a pixel circuit according to at least one embodiment of the present disclosure.

As shown in FIG. 46, on the basis of at least one embodiment of the pixel circuit shown in FIG. 33, the driving circuit includes a driving transistor DT, the first control circuit includes a first transistor T1, and the first energy storage circuit includes a first capacitor C1; the light emitting element is an organic light emitting diode O1; the first light emitting control circuit includes a fourth transistor T4;

The gate electrode of the first transistor T1 is electrically connected to the first light emitting control line EM1, the source electrode of the first transistor T1 is electrically connected to the power supply voltage terminal ELVDD, and the drain electrode of the first transistor T1 is electrically connected to the first node N1;

The gate electrode of the fourth transistor T4 is electrically connected to the second light emitting control line EM2, the source electrode of the fourth transistor T4 is electrically connected to the power supply voltage terminal ELVDD, and the drain electrode of the fourth transistor T4 is electrically connected to the drain electrode of the driving transistor DT;

The gate electrode of the driving transistor DT is electrically connected to the first node N1, the drain electrode of the driving transistor DT is electrically connected to the power supply voltage terminal ELVDD, and the source electrode of the driving transistor DT is electrically connected to the anode of the organic light emitting diode O1; the cathode of the organic light emitting diode O1 is electrically connected to the low voltage terminal ELVSS;

A first terminal of the first capacitor C1 is electrically connected to the second node N2, and a second terminal of the first capacitor C1 is electrically connected to the third node N3;

The second energy storage circuit includes a second capacitor C2, and the second initialization circuit includes a seventh transistor T7;

The gate electrode of the seventh transistor T7 is electrically connected to the first scanning terminal G1, the source electrode of the seventh transistor T7 is electrically connected to the initial voltage terminal I1, and the drain electrode of the seventh transistor T7 is electrically connected to the source electrode of the driving transistor DT; the initial voltage terminal I1 is configured to provide the initial voltage Vint;

The first terminal of the second capacitor C2 is electrically connected to the third node N3, and the second terminal of the second capacitor C2 is electrically connected to the source electrode of the driving transistor DT;

The first writing-in circuit includes an eighth transistor T8, and the second writing-in circuit includes a ninth transistor T9;

The gate electrode of the eighth transistor T8 is electrically connected to the reset terminal R0, the source electrode of the eighth transistor T8 is electrically connected to the power supply voltage terminal ELVDD, and the drain electrode of the eighth transistor T8 is electrically connected to the gate electrode of the driving transistor DT;

The gate electrode of the ninth transistor T9 is electrically connected to the reset terminal R0, and the drain electrode of the ninth transistor T9 is electrically connected to the third node N3;

The source electrode of the ninth transistor T9 is electrically connected to the initial voltage terminal I1;

The data writing-in circuit includes a tenth transistor T10;

The gate electrode of the tenth transistor T10 is electrically connected to the first scanning terminal G1, the source electrode of the tenth transistor T10 is electrically connected to the second node N2, and the drain electrode of the tenth transistor T10 is electrically connected to the data line Da.

In at least one embodiment of the pixel circuit shown in FIG. 46, all transistors are n-type transistors, but not limited thereto.

Figure 47:
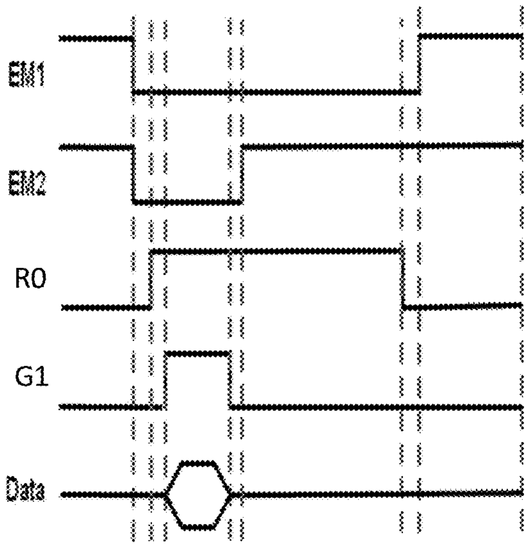
FIG. 47 is a working timing diagram of the pixel circuit shown in FIG. 46.

FIG. 47 is a working timing diagram of the pixel circuit shown in FIG. 46.

Figure 48:
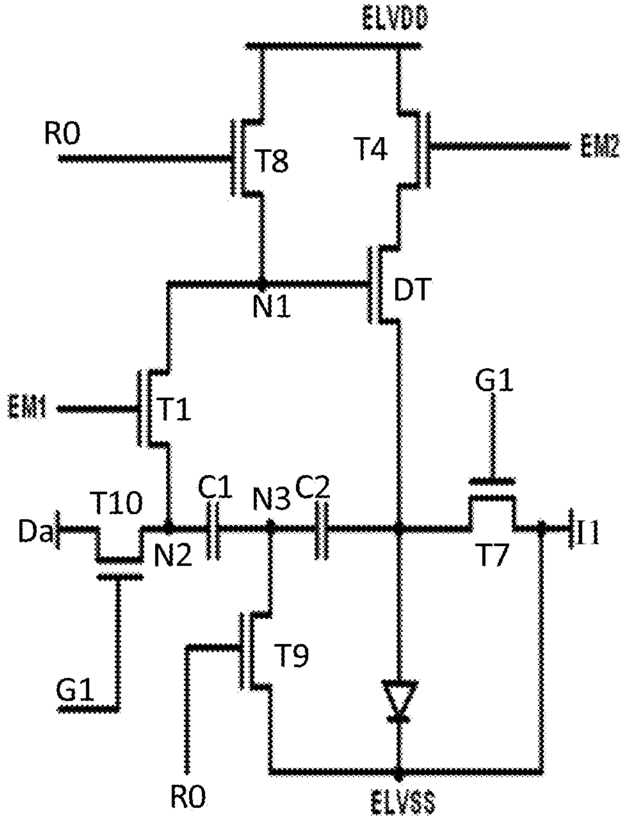
FIG. 48 is a circuit diagram of a pixel circuit according to at least one embodiment of the present disclosure.

The difference between at least one embodiment of the pixel circuit shown in FIG. 48 and at least one embodiment of the pixel circuit shown in FIG. 46 is that the source electrode of T9 is electrically connected to the low voltage terminal ELVSS, and the source electrode of T7 is electrically connected to the low voltage terminal ELVSS.

Figure 49:
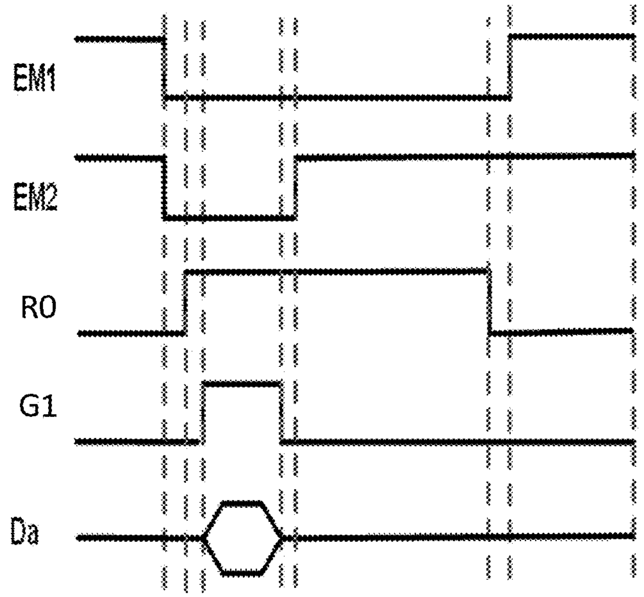
FIG. 49 is a working timing diagram of the pixel circuit shown in FIG. 48.

FIG. 49 is a working timing diagram of the pixel circuit shown in FIG. 48.

Figure 50:
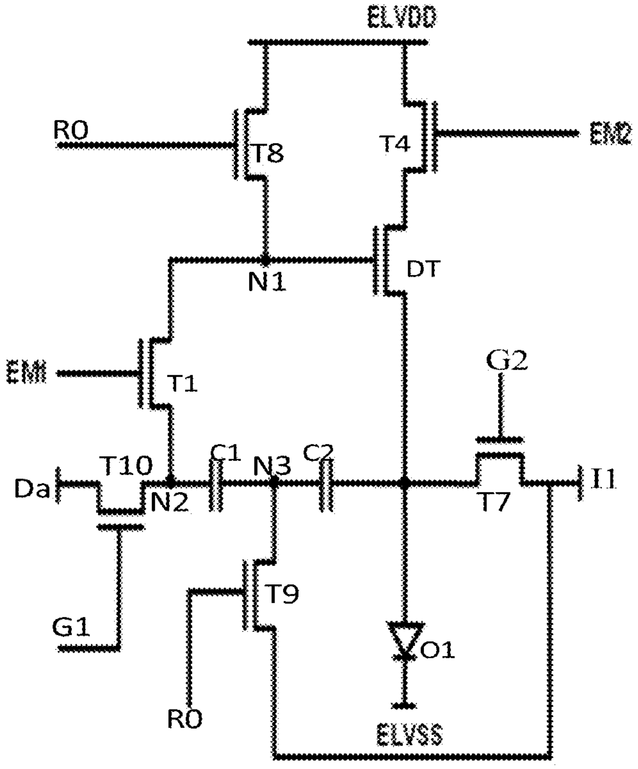
FIG. 50 is a circuit diagram of a pixel circuit according to at least one embodiment of the present disclosure.

The difference between at least one embodiment of the pixel circuit shown in FIG. 50 and at least one embodiment of the pixel circuit shown in FIG. 46 is that: the gate electrode of the seventh transistor T7 is electrically connected to the second scanning terminal G2.

Figure 51:
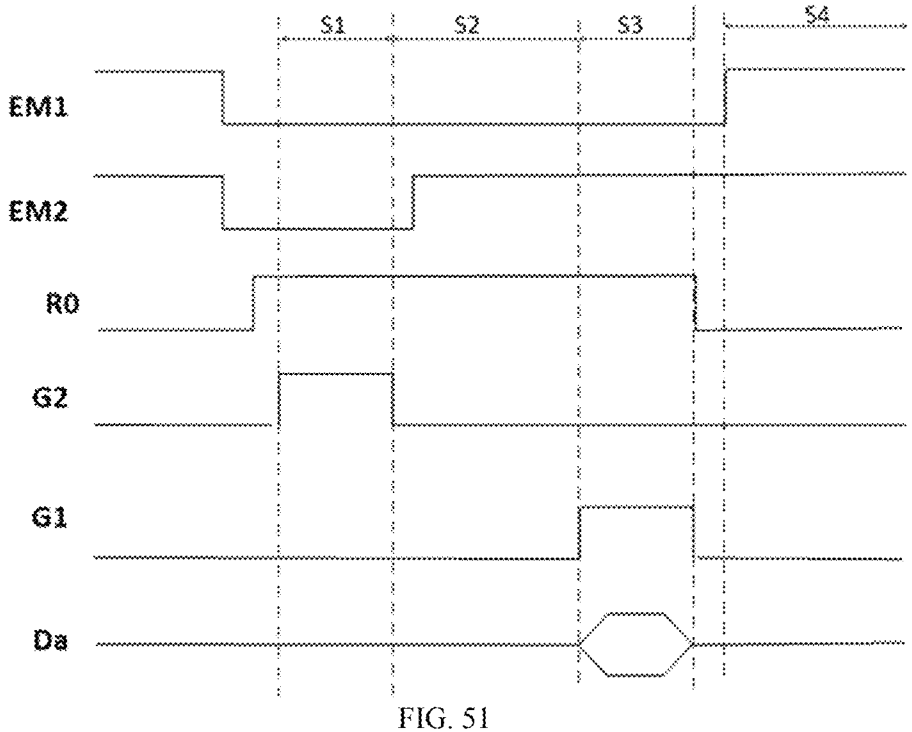
FIG. 51 is a working timing diagram of the pixel circuit shown in FIG. 50.

As shown in FIG. 51, when at least one embodiment of the pixel circuit shown in FIG. 50 of the present disclosure is working, the display period may include the first phase S1, the second phase S2, the third phase S3 and the fourth phase S4 which are set successively;

In the first phase S1, EM1 and EM2 provide low voltage signals, R0 provides high voltage signals, G2 provides high voltage signals, G1 provides low voltage signals, Da provides data voltage Vdata, and T8 is turned on to write the reference voltage Vref provided by VR into the gate electrode of DT, T1 and T4 are turned off, T10 is turned off, T9 is turned on to write the initial voltage Vint provided by I1 into the third node N3, and T7 is turned on to write Vint to the source electrode of DT;

In the second phase S2, EM1 provides a low voltage signal, EM2 provides a high voltage signal, R0 provides a high voltage signal, G1 provides a low voltage signal, T8 is turned on to write Vref to the gate electrode of DT, T9 is turned on to write Vref to into the third node N3; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off;

In the third phase S3, EM1 provides a low voltage signal, EM2 provides a high voltage signal, R0 provides a high voltage signal, G2 provides a low voltage signal, G1 provides a high voltage signal, and T10 is turned on to write the data voltage Vdata into the second node N2; At this time, the difference between the potential of N2 and the potential of the source electrode of DT is Vdata−(Vref−Vth); T4 is turned on, and the drain electrode of DT is electrically connected to ELVDD;

In the fourth phase S4, EM1 and EM2 provide high voltage signals, R0 provides low voltage signals, G1 provides low voltage signals, G2 provides low voltage signals, T4 is turned on, and the drain electrode of DT is electrically connected to ELVDD; T1 is turned on, and the gate potential of DT is Vdata, and the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

The difference between at least one embodiment of the pixel circuit shown in the present disclosure 52 and at least one embodiment of the pixel circuit shown in FIG. 50 of the present disclosure is that the source electrode of T7 is electrically connected to the third node N3, and the source electrode of T3 is not electrically connected to I1.

Figure 52:
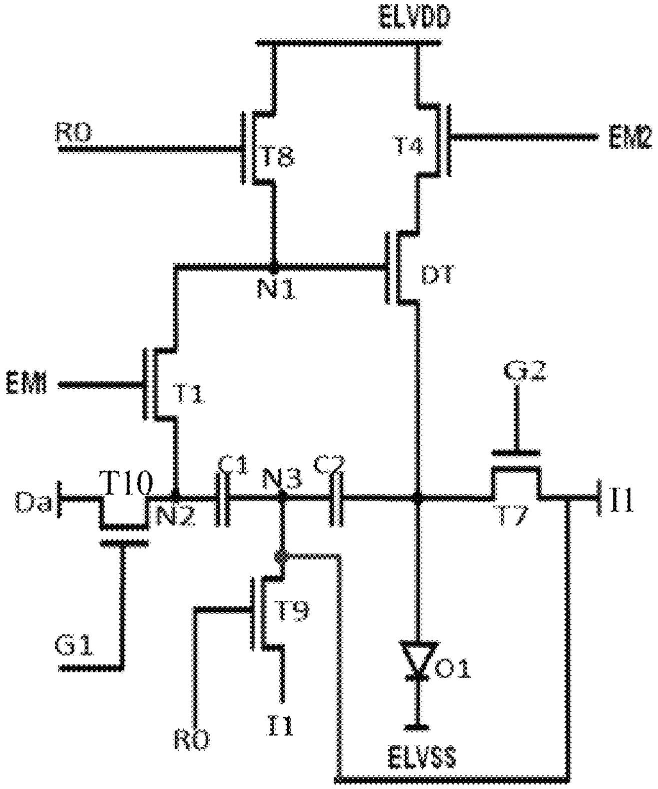
FIG. 52 is a circuit diagram of a pixel circuit according to at least one embodiment of the present disclosure.

As shown in FIG. 51, when at least one embodiment of the pixel circuit shown in FIG. 52 of the present disclosure is working, the display period may include the first phase S1, the second phase S2, the third phase S3 and the fourth phase S4 which are set successively;

In the first phase S1, EM1 and EM2 provide low voltage signals, R0 provides high voltage signals, G2 provides high voltage signals, G1 provides low voltage signals, Da provides data voltage Vdata, and T8 is turned on to write the reference voltage Vref provided by VR into the gate electrode of DT, T1 and T4 are turned off, T10 is turned off, T9 is turned on to write the initial voltage Vint provided by I1 into the third node N3, and T7 is turned on to write Vint to the source electrode of DT;

In the second phase S2, EM1 provides a low voltage signal, EM2 provides a high voltage signal, R0 provides a high voltage signal, G1 provides a low voltage signal, T8 is turned on to write Vref to the gate electrode of DT, T9 is turned on to write Vref to into the third node N3; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off;

In the third phase S3, EM1 provides a low voltage signal, EM2 provides a high voltage signal, R0 provides a high voltage signal, G2 provides a low voltage signal, G1 provides a high voltage signal, and T10 is turned on to write the data voltage Vdata into the second node N2; At this time, the difference between the potential of N2 and the potential of the source electrode of DT is Vdata−(Vref−Vth); T4 is turned on, and the drain electrode of DT is electrically connected to ELVDD;

In the fourth phase S4, EM1 and EM2 provide high voltage signals, R0 provides low voltage signals, G1 provides low voltage signals, G2 provides low voltage signals, T4 is turned on, and the drain electrode of DT is electrically connected to ELVDD; T1 is turned on, and the gate potential of DT is Vdata, and the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

Figure 53:
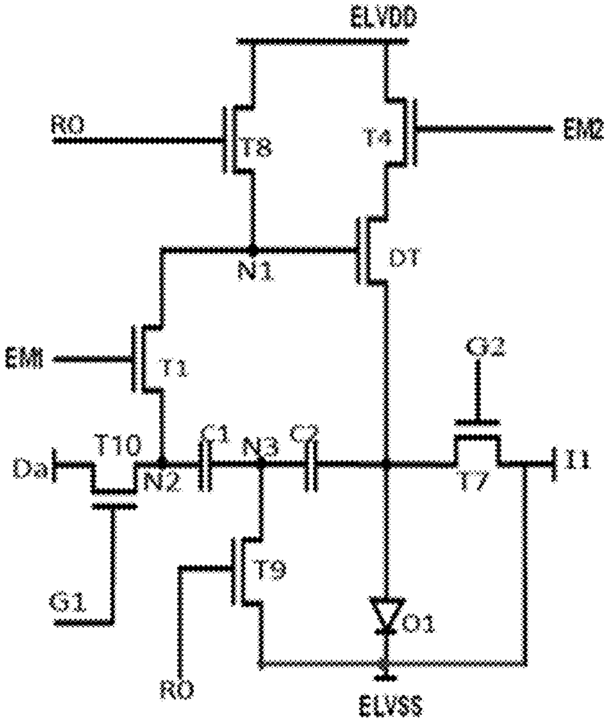
FIG. 53 is a circuit diagram of a pixel circuit according to at least one embodiment of the present disclosure.

The difference between at least one embodiment of the pixel circuit shown in FIG. 53 of the present disclosure and at least one embodiment of the pixel circuit shown in FIG. 50 of the present disclosure is that the source electrode of T7 and the source electrode of T9 are electrically connected to ELVSS, and the source electrode of T7 and the source electrode of T9 are not electrically connected to I1.

As shown in FIG. 51, when at least one embodiment of the pixel circuit shown in FIG. 53 of the present disclosure is working, the display cycle period include the first phase S1, the second phase S2, the third phase S3 and the fourth phase S4 that are set successively;

In the first phase S1, EM1 and EM2 provide low voltage signals, R0 provides high voltage signals, G2 provides high voltage signals, G1 provides low voltage signals, Da provides data voltage Vdata, and T8 is turned on to write the reference voltage Vref provided by VR into the gate electrode of DT, T1 and T4 are turned off, T10 is turned off, T9 is turned on to write the low voltage signal provided by ELVSS into the third node N3, and T7 is turned on to write the low voltage signal provided by ELVSS to the source electrode of DT;

In the second phase S2, EM1 provides a low voltage signal, EM2 provides a high voltage signal, R0 provides a high voltage signal, G1 provides a low voltage signal, T8 is turned on to write Vref into the gate electrode of DT, T9 is turned on to write the low voltage signal provided by ELVSS into the third node N3; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off;

In the third phase S3, EM1 provides a low voltage signal, EM2 provides a high voltage signal, R0 provides a high voltage signal, G2 provides a low voltage signal, G1 provides a high voltage signal, and T10 is turned on to write the data voltage Vdata into the second node N2; At this time, the difference between the potential of N2 and the potential of the source electrode of DT is Vdata−(Vref−Vth); T4 is turned on, and the drain electrode of DT is electrically connected to ELVDD;

In the fourth phase S4, EM1 and EM2 provide high voltage signals, R0 provides low voltage signals, G1 provides low voltage signals, G2 provides low voltage signals, T4 is turned on, and the drain electrode of DT is electrically connected to ELVDD; T1 is turned on, and the gate potential of DT is Vdata, and the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

Figure 54:
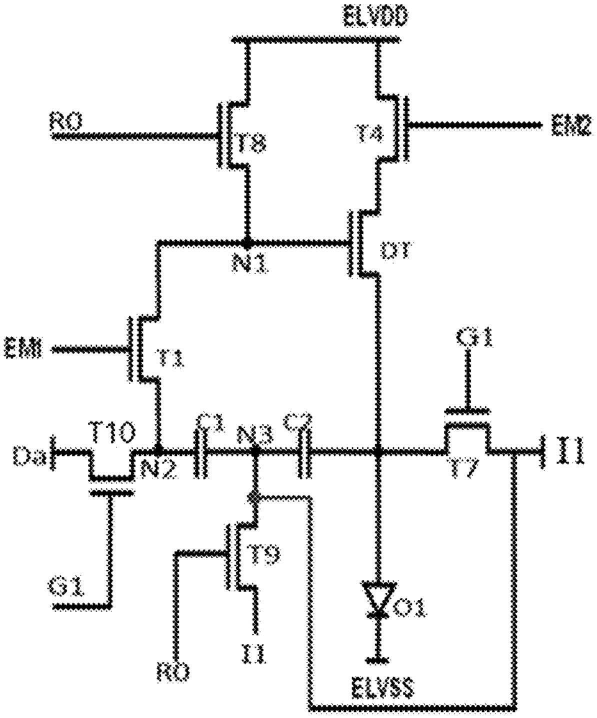
FIG. 54 is a circuit diagram of a pixel circuit according to at least one embodiment of the present disclosure.

The difference between at least one embodiment of the pixel circuit shown in FIG. 54 and at least one embodiment of the pixel circuit shown in FIG. 46 is that: the source electrode of T7 is electrically connected to the third node N3, and the source electrode of T7 is not electrically connected to I1.

Figure 55:
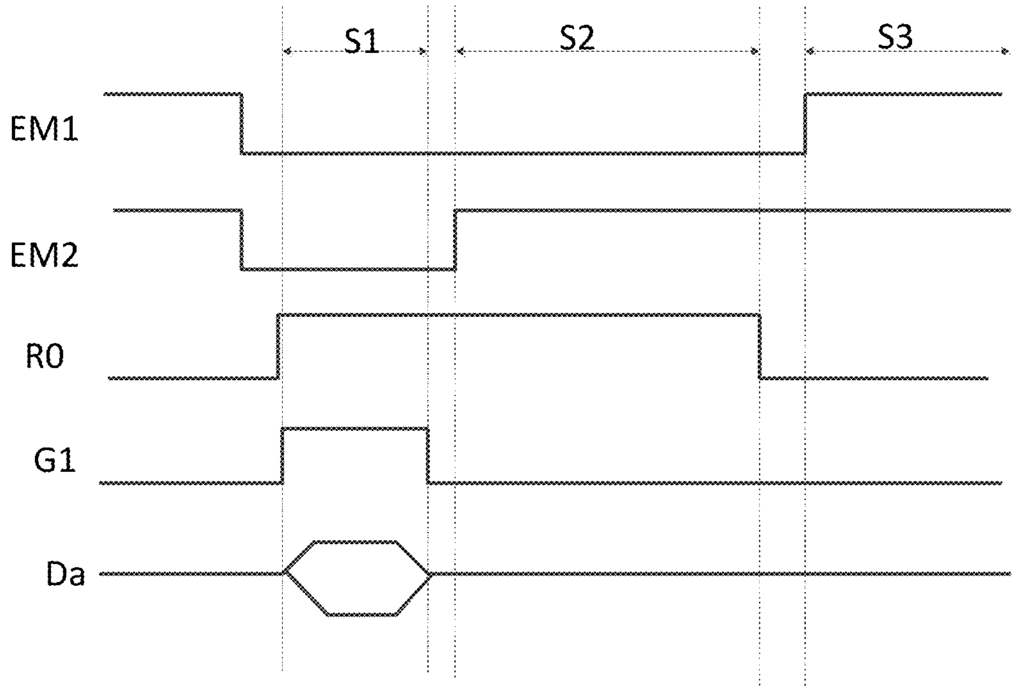
FIG. 55 is a working timing diagram of the pixel circuit shown in FIG. 54.

As shown in FIG. 55, when at least one embodiment of the pixel circuit shown in FIG. 54 of the present disclosure is working, the display period may include a first phase S1, a second phase S2, and a third phase S3 that are set successively;

In the first phase S1, EM1 and EM2 provide a low voltage signal, R0 provides a high voltage signal, G1 provides a high voltage signal, Da provides a data voltage Vdata, T9 is turned on to write the initial voltage Vint provided by I1 into the third node N3, T1 and T4 are turned off, T10 is turned on to write the data voltage Vdata into the second node N2, T9 is turned on to control to connect the first node N1 and the third node N3, so that the potential of the first node N1 is Vref; T7 is turned on to write Vint to the source electrode of DT;

In the second phase S2, EM1 provides a low voltage signal, EM2 provides a high voltage signal, R0 provides a high voltage signal, G1 provides a low voltage signal, T8 is turned on to write Vref into the third node N3, T9 is turned on to control to connect the first node N1 and the third node N3, so that the potential of the first node N1 is Vref; T4 is turned on, and the drain electrode of DT is electrically connected to ELVDD;

At the beginning of the second phase S2, DT is turned on, and DT compensates the threshold voltage in a source-follower manner, and the source potential of DT increases continuously from Vint until the source potential of DT becomes Vref−Vth, at this time the threshold voltage compensation is completed, DT is turned off; at this time, the difference between the potential of N2 and the potential of the source electrode of DT is Vdata−(Vref−Vth);

In the third phase S3, EM1 and EM2 provide high voltage signals, R0 provides low voltage signals, G1 provides low voltage signals, T1 and T4 are turned on, the drain electrode of DT is electrically connected to ELVDD, and the gate potential of DT is Vdata, the gate-source voltage of DT is Vdata−Vref+Vth; at this time, the current Ioled flowing through O1 is equal to $K(Vdata-Vref)^2$; where K is the current coefficient of DT. Referring to the above equation, the current Ioled supplied by the driving transistor DT to O1 can be determined according to the voltage difference between Vdata and Vref; since Vref is a fixed voltage, Ioled can be determined according to Vdata.

The driving method described in the embodiment of the present disclosure is applied to the above-mentioned pixel circuit, and the driving method includes:

driving, by the driving circuit, the light emitting element under the control of a potential of the control terminal of the driving circuit;

controlling, by the first control circuit, to connect the first node and the second node under the control of the first light emitting control signal provided by the first light emitting control line;

storing, by the first energy storage circuit, electric energy;

writing, by the data writing-in circuit, the data voltage provided by the data line into the second node under the control of the first scanning signal provided by the first scanning terminal.

Optionally, the pixel circuit further includes a first initialization circuit; the display period includes a first phase and a second phase set successively, and the driving method further includes:

In the first phase, the first initialization circuit writing the first reset voltage into the second terminal of the driving circuit;

In the second phase, the first initialization circuit writing the first reset voltage into the second terminal of the driving circuit; the data writing-in circuit writing the data voltage provided by the data line into the second node under the control of the first scanning signal.

The driving method described in the embodiment of the present disclosure is applied to the above-mentioned pixel circuit, and the driving method includes:

Driving, by the driving circuit, the light emitting element under the control of the potential of the control terminal of the driving circuit;

Controlling, by the first control circuit, to connect the first node and the second node under the control of the first light emitting control signal provided by the first light emitting control line;

Storing, by the first energy storage circuit, electric energy; storing, by the second energy storage circuit, electric energy;

Writing, by the data writing-in circuit, the data voltage provided by the data line into the second node under the control of the first scanning signal provided by the first scanning terminal;

Controlling, by the second initialization circuit, to connect the second terminal of the driving circuit and the second reset voltage terminal under the control of the scanning signal provided by the scanning terminal;

Controlling, by the second writing-in circuit, the potential of the third node under the control of the reset signal provided by the reset terminal.

Optionally, the pixel circuit further includes a first writing-in circuit; the display period includes a first phase and a second phase set successively; the driving method includes:

In the first phase, the first writing-in circuit writing the writing-in voltage into the control terminal of the driving circuit, the second initialization circuit controlling to connect the second terminal of the driving circuit and the second reset voltage terminal, and the second writing-in circuit writing the first reset voltage into the third node, and the data writing-in circuit writing the data voltage provided by the data line into the second node;

In the second phase, the first writing-in circuit writing the writing-in voltage into the control terminal of the driving circuit, and the second writing-in circuit writing the first reset voltage into the third node.

Optionally, the pixel circuit further includes a first writing-in circuit; the display period includes a first phase and a second phase set successively; the driving method includes:

In the first phase, the first writing-in circuit writing the writing-in voltage into the control terminal of the driving circuit or the third node, and the second initialization circuit controlling to connect the second terminal of the driving circuit and the second reset voltage terminal, the second writing-in circuit controlling to connect the control terminal of the driving circuit and the third node, and the data writing-in circuit writing the data voltage provided by the data line into the second node;

In the second phase, the first writing-in circuit writing the writing-in voltage into the control terminal of the driving circuit or the third node, and the second writing-in circuit controlling to connect the control terminal of the driving circuit and the third node.

The display device described in the embodiment of the present disclosure includes the pixel circuit.

The display device provided by the embodiments of the present disclosure may be any product or component with a display function, such as a mobile phone, a tablet computer, a television, a monitor, a notebook computer, a digital photo frame, a navigator, and the like.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A pixel circuit, comprising a light emitting element, a driving circuit, a first energy storage circuit, a first control circuit and a data writing-in circuit; wherein a control terminal of the driving circuit is electrically connected to a first node, a first terminal of the driving circuit is electrically connected to a power supply voltage terminal, and a second terminal of the driving circuit is electrically connected to the light emitting element; the driving circuit is configured to drive the light emitting element under the control of a potential of the control terminal of the driving circuit;

a control terminal of the first control circuit is electrically connected to a first light emitting control line, a first terminal of the first control circuit is electrically connected to the first node, and a second terminal of the first control circuit is electrically connected to a second node; the first control circuit is configured to control to connect the first node and the second node under the control of a first light emitting control signal provided by the first light emitting control line;

a first terminal of the first energy storage circuit is electrically connected to the second node, and a second terminal of the first energy storage circuit is electrically connected to the second terminal of the driving circuit; the first energy storage circuit is configured to store electric energy;

the data writing-in circuit is electrically connected to a first scanning terminal, the second node and a data line respectively, and is configured to write a data voltage provided by the data line into the second node under the control of a first scanning signal provided by the first scanning terminal wherein the pixel circuit further comprises a second energy storage circuit and a second initialization circuit; wherein a second terminal of the first energy storage circuit is electrically connected to the second terminal of the driving circuit through the second energy storage circuit;

a first terminal of the second energy storage circuit is electrically connected to a third node, a second terminal of the second energy storage circuit is electrically connected to the second terminal of the driving circuit, and the second energy storage circuit is configured to store electrical energy;

the second initialization circuit is electrically connected to a scanning terminal, the second terminal of the driving circuit, and the second reset voltage terminal, and is configured to control to connect the second terminal of the driving circuit and the second reset voltage terminal under the control of a scanning signal provided by the scanning terminal;

the second reset voltage terminal includes an initial voltage terminal, a first voltage terminal or a third node;

the scanning terminal includes a first scanning terminal or a second scanning terminal.

2. The pixel circuit according to claim 1, further comprising a first reference voltage writing-in circuit; wherein the first reference voltage writing-in circuit is electrically connected to a second reset terminal and the first node respectively, and the first reference voltage writing-in circuit is also electrically connected to a reference voltage terminal or the power supply voltage terminal, is configured to write a reference voltage provided by the reference voltage terminal or a power supply voltage provided by the power voltage terminal into the first node under the control of a second reset signal provided by the second reset terminal.

3. The pixel circuit according to claim 2, further comprising a second reference voltage writing-in circuit; wherein the second reference voltage writing-in circuit is respectively electrically connected to a first reset terminal, the reference voltage terminal and the first node, and is configured to write the reference voltage into the first node under the control of the first reset signal provided by the first reset terminal.

4. The pixel circuit according to claim 3, wherein the second reference voltage writing-in circuit comprises a third transistor;

a gate electrode of the third transistor is electrically connected to the first reset terminal, a first electrode of the third transistor is electrically connected to the reference voltage terminal, and a second electrode of the third transistor is electrically connected to the first node.

5. The pixel circuit according to claim 2, further comprising a first light emitting control circuit; wherein the first light emitting control circuit is electrically connected to a second light emitting control line, the power supply voltage terminal and the first terminal of the driving circuit, and is configured to control to connect the power supply voltage terminal and the first terminal of the driving circuit under the control of the second light emitting control signal provided by the second light emitting control line.

6. The pixel circuit according to claim 5, further comprising a second light emitting control circuit; wherein the second light emitting control circuit is electrically connected to the second light emitting control line, the second terminal of the driving circuit and a first terminal of the light emitting element respectively, is configured to control to connect the second terminal of the driving circuit and the first terminal of the light emitting element under the control of the second light emitting control signal provided by the second light emitting control line, wherein the first light emitting control circuit comprises a fourth transistor;

a gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit;

the second light emitting control circuit includes a fifth transistor;

a gate electrode of the fifth transistor is electrically connected to the second light emitting control line, a first electrode of the fifth transistor is electrically connected to the second terminal of the driving circuit, a second electrode of the fifth transistor is electrically connected to the first terminal of the light emitting element.

7. The pixel circuit according to claim 2, wherein the first reference voltage writing-in circuit includes a second transistor;

a gate electrode of the second transistor is electrically connected to the second reset terminal, a first electrode of the second transistor is electrically connected to the reference voltage terminal, and a second electrode of the second transistor is electrically connected to the first node; or, the gate electrode of the second transistor is electrically connected to the second reset terminal, the first electrode of the second transistor is electrically connected to the power supply voltage terminal, and the second electrode of the second transistor is electrically connected to the first node.

8. The pixel circuit according to claim 1, wherein the driving circuit comprises a driving transistor, the first control circuit comprises a first transistor, and the first energy storage circuit comprises a first capacitor;

a gate electrode of the first transistor is electrically connected to the first light emitting control line, a first electrode of the first transistor is electrically connected to the first node, and a second electrode of the first transistor is electrically connected to the second node;

a gate electrode of the driving transistor is electrically connected to the first node, a first electrode of the driving transistor is electrically connected to the power supply voltage terminal, and a second electrode of the driving transistor is electrically connected to the light emitting element;

a first terminal of the first capacitor is electrically connected to the second node, and a second terminal of the first capacitor is electrically connected to a second electrode of the driving transistor.

9. A driving method applied to the pixel circuit according to claim 1, wherein the driving method comprises:

driving, by the driving circuit, the light emitting element under the control of the potential of the control terminal of the driving circuit;

controlling, by the first control circuit, to connect the first node and the second node under the control of the first light emitting control signal provided by the first light emitting control line;

storing, by the first energy storage circuit, electric energy;

writing, by the data writing-in circuit, the data voltage provided by the data line into the second node under the control of the first scanning signal provided by the first scanning terminal.

10. A display device comprising the pixel circuit according to claim 1.

11. A pixel circuit, comprising a light emitting element, a driving circuit, an energy storage unit, a first control circuit, a data writing-in circuit and a second initialization circuit; wherein a control terminal of the driving circuit is electrically connected to a first node, a first terminal of the driving circuit is electrically connected to a power supply voltage terminal, and a second terminal of the driving circuit is electrically connected to the light emitting element; the driving circuit is configured to drive the light emitting element under the control of a potential of the control terminal of the driving circuit;

a control terminal of the first control circuit is electrically connected to a first light emitting control line, a first terminal of the first control circuit is electrically connected to the first node, and a second terminal of the first control circuit is electrically connected to a second node; the first control circuit is configured to control to connect the first node and the second node under the control of a first light emitting control signal provided by the first light emitting control line;

the data writing-in circuit is electrically connected to a first scanning terminal, the second node and a data line respectively, and is configured to write a data voltage provided by the data line into the second node under the control of a first scanning signal provided by the first scanning terminal;

the second initialization circuit is electrically connected to a scanning terminal, the second terminal of the driving circuit, and a second reset voltage terminal, and is configured to control to connect the second terminal of the driving circuit and the second reset voltage terminal under the control of a scanning signal provided by the scanning terminal;

the energy storage unit includes a first energy storage circuit, a second energy storage circuit and a second writing-in circuit;

a first terminal of the first energy storage circuit is electrically connected to the second node, a second terminal of the first energy storage circuit is electrically connected to the third node, and the first energy storage circuit is configured to store electric energy;

a first terminal of the second energy storage circuit is electrically connected to the third node, a second terminal of the second energy storage circuit is electrically connected to the second terminal of the driving circuit, and the second energy storage circuit is configured to store electrical energy;

the second writing-in circuit is electrically connected to a reset terminal and the third node respectively, and is configured to control a potential of the third node under the control of a reset signal provided by the reset terminal.

12. The pixel circuit according to claim 11, further comprising a first writing-in circuit; wherein The first writing-in circuit is electrically connected to the reset terminal, a writing-in voltage terminal and a writing-in node respectively, and is configured to write a writing-in voltage provided by the writing-in voltage terminal into the writing-in node under the control of the reset signal provided by the reset terminal;

the writing-in node includes the first node or the third node, and the writing-in voltage terminal includes a reference voltage terminal or the power supply voltage terminal, wherein the first writing-in circuit comprises an eighth transistor;

a gate electrode of the eighth transistor is electrically connected to the reset terminal, a first electrode of the eighth transistor is electrically connected to the reference voltage terminal, and a second electrode of the eighth transistor is electrically connected to the control terminal of the driving circuit.

13. The pixel circuit according to claim 12, wherein the second writing-in circuit is further electrically connected to a first reset voltage terminal, and is configured to write a first reset voltage provided by the first reset voltage terminal into the third node under the control of the reset signal provided by the reset terminal;

the first reset voltage terminal includes the initial voltage terminal, the first voltage terminal, the reference voltage terminal or the power supply voltage terminal, wherein the second writing-in circuit comprises a ninth transistor;

a gate electrode of the ninth transistor is electrically connected to the reset terminal, a first electrode of the ninth transistor is electrically connected to the first reset voltage terminal, and a second electrode of the ninth transistor is electrically connected to the third node.

14. The pixel circuit according to claim 11, wherein the second reset voltage terminal comprises an initial voltage terminal, a first voltage terminal or a third node;

the scanning terminal includes a first scanning terminal or a second scanning terminal.

15. The pixel circuit according to claim 11, wherein the second writing-in circuit is further electrically connected to the control terminal of the driving circuit, and is configured to control to connect the control terminal of the driving circuit and the third node under the control of the reset signal, wherein the second writing-in circuit comprises a ninth transistor;

a gate electrode of the ninth transistor is electrically connected to the reset terminal, a first electrode of the ninth transistor is electrically connected to the third node, and a second electrode of the ninth transistor is connected to the control circuit of the driving circuit.

16. The pixel circuit according to claim 11, further comprising a first light emitting control circuit; wherein the first light emitting control circuit is electrically connected to a second light emitting control line, the power supply voltage terminal and the first terminal of the driving circuit respectively, is configured to control to connect the power supply voltage terminal and the first terminal of the driving circuit under the control of a second light emitting control signal provided by the second light emitting control line, wherein the first light emitting control circuit comprises a fourth transistor;

a gate electrode of the fourth transistor is electrically connected to the second light emitting control line, a first electrode of the fourth transistor is electrically connected to the power supply voltage terminal, and a second electrode of the fourth transistor is electrically connected to the first terminal of the driving circuit.

17. The pixel circuit according to claim 11, wherein the first energy storage circuit comprises a first capacitor; the second energy storage circuit comprises a second capacitor, and the second initialization circuit comprises a seventh transistor;

a gate electrode of the seventh transistor is electrically connected to a first scanning terminal or a second scanning terminal, a first electrode of the seventh transistor is electrically connected to a second reset voltage terminal, and a second electrode of the seventh transistor electrically connected to the second terminal of the driving circuit;

a first terminal of the first capacitor is electrically connected to the second node, and a second terminal of the first capacitor is electrically connected to the third node;

a first terminal of the second capacitor is electrically connected to the third node, and a second terminal of the second capacitor is electrically connected to the second terminal of the driving circuit.

18. The pixel circuit according to claim 11, wherein the data writing-in circuit comprises a tenth transistor;

a gate electrode of the tenth transistor is electrically connected to the first scanning terminal, a first electrode of the tenth transistor is electrically connected to the second node, and a second electrode of the tenth transistor is electrically connected to the data line;

the first control circuit includes a first transistor;

a gate electrode of the first transistor is electrically connected to the first light emitting control line, a first electrode of the first transistor is electrically connected to the first node, and a second electrode of the first transistor is electrically connected to the second node.

* * * * *